(12) United States Patent
Payne et al.

(10) Patent No.: US 6,674,435 B1
(45) Date of Patent: Jan. 6, 2004

(54) FAST, SYMMETRIC, INTEGER BEZIER CURVE TO POLYGON CONVERSION

(75) Inventors: Ralph E. Payne, Dallas, TX (US); Lowell Boggs, Lewisville, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/382,144

(22) Filed: Aug. 24, 1999

Related U.S. Application Data

(60) Provisional application No. 60/100,498, filed on Sep. 16, 1998.

(51) Int. Cl.[7] .................................................. G06T 11/00
(52) U.S. Cl. ....................... 345/442; 345/440; 345/442; 345/443; 382/241; 382/242
(58) Field of Search ................................. 345/442, 441, 345/443, 440; 382/241, 242; 358/1.3, 1.9

(56) References Cited

U.S. PATENT DOCUMENTS

| | | | | |
|---|---|---|---|---|
| 4,620,287 A | * | 10/1986 | Yam ............................ | 364/518 |
| 4,855,935 A | * | 8/1989 | Lien et al. ................... | 364/521 |
| 5,241,654 A | * | 8/1993 | Kai et al. .................... | 395/142 |
| 5,253,336 A | * | 10/1993 | Yamada ....................... | 395/142 |
| 5,287,441 A | * | 2/1994 | Nakamura ................... | 345/441 |
| 5,309,521 A | * | 5/1994 | Matsukawa .................. | 382/22 |
| 5,337,404 A | * | 8/1994 | Baudelaire et al. ......... | 395/141 |
| 5,363,479 A | * | 11/1994 | Olynyk ........................ | 395/142 |
| 5,367,617 A | * | 11/1994 | Goossen et al. ............ | 395/142 |
| 5,422,990 A | * | 6/1995 | Siverbrook et al. ......... | 395/142 |
| 5,471,573 A | * | 11/1995 | Kaasila ........................ | 395/141 |
| 5,500,927 A | * | 3/1996 | Sander-Cederlof et al. . | 395/133 |
| 5,638,503 A | * | 6/1997 | Hoel ............................ | 395/142 |
| 5,694,535 A | * | 12/1997 | Broekhuijsen ............... | 395/142 |
| 5,717,905 A | * | 2/1998 | Iwamoto et al. ............ | 395/500 |
| 5,731,820 A | * | 3/1998 | Broekhuijsen ............... | 345/442 |
| 5,857,067 A | * | 1/1999 | Hassett et al. .............. | 395/150 |
| 5,877,743 A | * | 3/1999 | Dzik ............................ | 345/612 |
| 6,111,588 A | * | 8/2000 | Newell ........................ | 345/442 |
| 6,137,500 A | * | 10/2000 | Silverbrook et al. ........ | 345/442 |

* cited by examiner

*Primary Examiner*—Michael Razavi
*Assistant Examiner*—Daniel J Chung
(74) *Attorney, Agent, or Firm*—Robert D. Marshall, Jr.; W. James Brady, III; Frederick J. Telecky, Jr.

(57) ABSTRACT

A printer forms an approximate of a Bezier curve as a sequence of line segments. Two parametric equations, X(t) and Y(t), are employed. Two methods can be used to evaluate the parametric equations. Both use fixed point integer arithmetic to directly calculate points along the curve which are the values of the X(t) and Y(t) equations. The first method sets the number of steps of the parametric variable are equal to an integral power of 2. This gives a predictable execution time and uses line segments to connect the points as a piecewise straight line approximation to the curve. The number of steps is set as the next higher power of 2 than an estimated length of the curve. The second method allows Y(t), the scan line variable, to change only in predetermined integer steps. The value of X(t) is evaluated for each t corresponding to the integer step in Y(t). This second method has a natural advantage, if a closed path is being decomposed as a run array rather than a collection of trapezoids. Both methods create the lines segments in natural scan line order. This is advantageous for polygon fill algorithms because it eliminates the need for edge sorting.

10 Claims, 6 Drawing Sheets

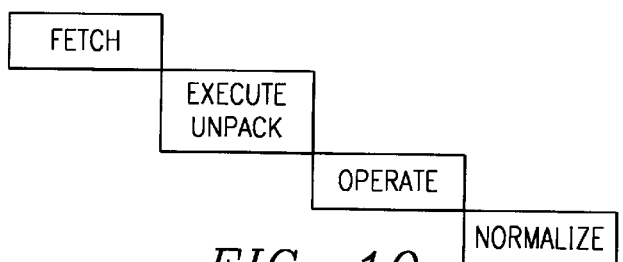
FIG. 9
(PRIOR ART)
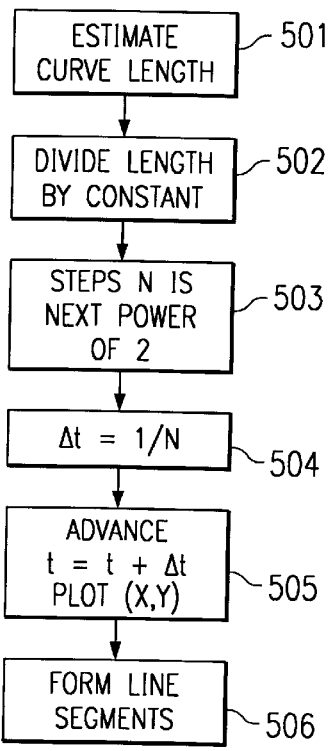
FIG. 12
FIG. 10
(PRIOR ART)
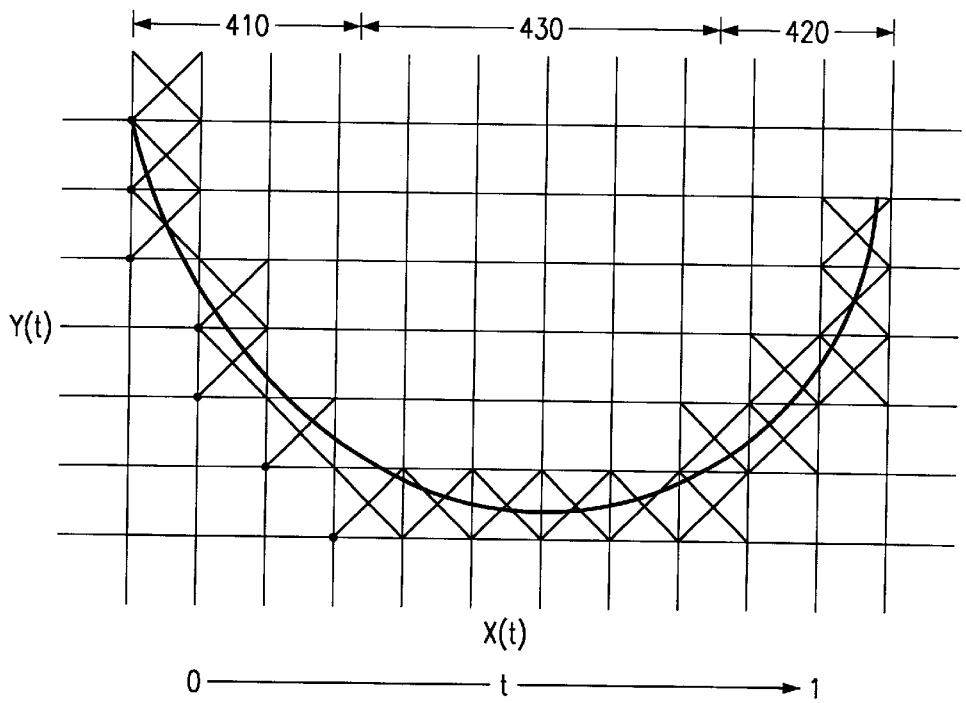
FIG. 11

FAST, SYMMETRIC, INTEGER BEZIER CURVE TO POLYGON CONVERSION

This application claims priority under 35 USC §119(e)(1) of Provisional Application No. 60/100,498, filed Sep. 16, 1998.

TECHNICAL FIELD OF THE INVENTION

The technical field of this invention is conversion of Bezier curves to visually attractive line segment approximations that can be quickly drawn or manipulated as polygons.

BACKGROUND OF THE INVENTION

Bezier curves are mathematically described curves. A Bezier curve of order n is given by the parametric equation in u of:

$$P(u) = \sum_{i=0}^{n} P_i \frac{n!}{i!(n-i)!} u^i (1-u)^{n-1} \quad (1)$$

where: u is the parametric variable, u=0 yields the beginning point and u=1 yields the end point; n is the order of the Bezier curve; i is an index variable for the summation; and $P_i$ are control points for the Bezier curve. The Bezier curve intersects the first and last control points and has a shape determined by the intermediate control points and the order.

Most computer generated Bezier curves are limited to an order of 3. A Bezier curve of order 3 is given by the equation:

$$P(u) = P_0(1-u)^3 + P_1 3u(1-u)^2 + P_2 3u^2(1-u) + P_3 u^3 \quad (2)$$

where: $P_0$, $P_1$, $P_2$ and $P_3$ are the control points expressed in (x,y) coordinates. Bezier curves of order 3 are specified with 4 controlling points. The first point $P_0$ and the fourth point $P_3$ define the respective beginning point and end point of the curve. The slope of the curve at the beginning point corresponds to the slope of the line segment joining the first point $P_0$ and the second point $P_1$. The slope at the end point corresponds to the slope of the line segment joining the third point $P_2$ and the fourth point $P_3$.

Many computer programs draw using curves defined via Bezier equations. There are prior art techniques for rendering these curves into a series of points that can be displayed or printed. One known technique uses known mathematics to split the Bezier curve into two halves, each half also being a Bezier curve. This technique is described in the book, Principles of Interactive Computer Graphics, by Newman and Sproull (1979). Following splitting, each half is tested to determine if it is "approximately" straight. The method proceeds recursively splitting the curve into equal halves until the each half is "approximately" straight. These approximately straight sections are rendered as line segments. The approximations produced by this recursive decomposition method are somewhat attractive, in that they are slightly asymmetric. Further, there is a significant amount of computational overhead associated with the recursion process itself and with determining whether or not the curve is "approximately" straight. This technique produces line segments in the order of the binary decomposition. This is a scramble of the order necessary for the later polygon or trapezoid processing often used in graphics applications. Thus the line segments must be re-ordered, requiring additional processing time.

It is possible to directly compute points on the Bezier curve from the definition equations. These calculations generally require floating point numbers due to the dynamic range of the quantities involved. Such direct calculation using floating point numbers can be performed using a floating point unit attached to the data processor. This involves an additional expense for the additional hardware of the floating point unit. It is possible to emulate floating point computations on an integer processor, but this is very time consuming.

There are integer approximation techniques for drawing Bezier curves into a pixel map of the image. These techniques involve comparison of the slope of the curve at a particular point and determination of which of the eight adjacent points is the next point to be plotted. This technique thus provides a raster scan rendered curve. For some applications this advantageously bypasses a step of rendering a line segment. In other cases, the line segments are needed for later polygon or trapezoid processing, thus the line segments must be determined from the pixel by pixel plot. This technique is best suited for rendering for computer monitors rather than printers. Surprisingly, printers typically require faster rendering performance that computer monitors. Computer monitors typically are updated from a pixel map memory. Thus the curve can be rendered into the pixel map memory much slower than the speed of the display. Printers typically do not store entire pixel maps due to the much greater number of pixels on a printed page than on a computer monitor. Typical printers render the page into stripes or bands, thus reducing the storage requirements. However, once started on printing a page many color laser printers cannot be slowed or stopped without spoiling the page. The print driver thus must provide data at the speed of the printer. Thus this pixel by pixel rendering of a Bezier curve typically is too slow for use with color laser printers.

SUMMARY OF THE INVENTION

A major problem using Bezier curves and the known techniques is conversion into a raster scan form that can be printed via a color laser printer. The rendering must be as fast as print engine forming the dots on the page. It is generally better to render Bezier curves into line segments for polygon or trapezoid processing, such as determining polygon clipping and occlusion. Such processes are speeded if the line segments are produced in scan order.

In order to approximate the specified Bezier curve as a sequence of line segments, it is necessary to use 2 parametric equations, X(t) and Y(t) each of which is a third degree polynomial in t whose value ranges from 0.0 to 1.0. Two methods can be used to evaluate the parametric equations. Both use fixed point integer arithmetic to directly calculate points along the curve which are the values of the X(t) and Y(t) equations. The first method gives a predictable execution time and uses line segments to connect the points as a piecewise straight line approximation to the curve. The second method allows Y(t), the scan line variable, to change only in predetermined integer steps. The value of X(t) is evaluated for each t corresponding to the integer step in Y(t). Since X(t) can be multi-valued for each scan line, it is necessary to guarantee that the scan line is closed at the inflection points of the Bezier curve. This second method gives a new x value for each scan line. This has a natural advantage, if a closed path is being decomposed as a run array rather than a collection of trapezoids. Both methods create the lines segments in natural scan line order. This is advantageous for polygon fill algorithms because it eliminates the need for edge sorting.

BRIEF DESCRIPTION OF THE DRAWINGS

These and other aspects of this invention are illustrated in the drawings, in which:

FIG. 9 illustrates the prior art integer pipeline operation of the master processor;

FIG. 10 illustrates the prior art floating point pipeline operation of the master processor;

FIG. 11 illustrates three slope regions in an example Bezier curve; and

FIG. 12 illustrates the steps in a first method of this invention.

DETAILED DESCRIPTION OF PREFERRED EMBODIMENTS

Figure 1:
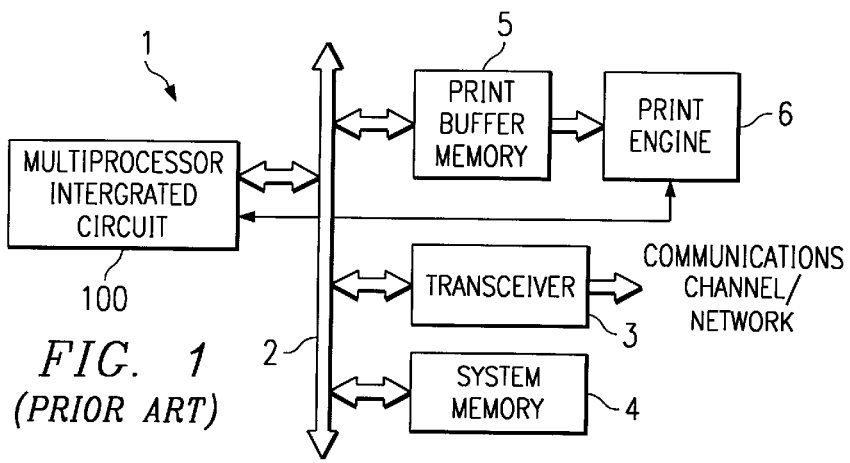
FIG. 1 illustrates the system architecture of an image processing system such as would employ this invention.

FIG. 1 is a block diagram of a network printer system 1 including a multiprocessor integrated circuit 100 constructed for image and graphics processing according to this invention. Multiprocessor integrated circuit 100 provides the data processing including data manipulation and computation for image operations of the network printer system of FIG. 1. Multiprocessor integrated circuit 100 is bi-directionally coupled to a system bus 2.

FIG. 1 illustrates transceiver 3. Transceiver 3 provides translation and bidirectional communication between the network printer bus and a communications channel. One example of a system employing transceiver 3 is a local area network. The network printer system illustrated in FIG. 1 responds to print requests received via the communications channel of the local area network. Multiprocessor integrated circuit 100 provides translation of print jobs specified in a page description language, such as PostScript, into data and control signals for printing.

FIG. 1 illustrates a system memory 4 coupled to the network printer system bus. This memory may include video random access memory, dynamic random access memory, static random access memory, nonvolatile memory such as EPROM, FLASH or read only memory or a combination of these memory types. Multiprocessor integrated circuit 100 may be controlled either in wholly or partially by a program stored in the memory 4. This memory 4 may also store various types of graphic image data.

In the network printer system of FIG. 1 multiprocessor integrated circuit 100 communicates with print buffer memory 5 for specification of a printable image via a pixel map. Multiprocessor integrated circuit 100 controls the image data stored in print buffer memory 5 via the network printer system bus 2. Data corresponding to this image is recalled from print buffer memory 5 and supplied to print engine 6. Print engine 6 provides the mechanism that places color dots on the printed page. Print engine 6 is further responsive to control signals from multiprocessor integrated circuit 100 for paper and print head control. Multiprocessor integrated circuit 100 determines and controls where print information is stored in print buffer memory 5. Subsequently, during readout from print buffer memory 5, multiprocessor integrated circuit 100 determines the readout sequence from print buffer memory 5, the addresses to be accessed, and control information needed to produce the desired printed image by print engine 6.

According to the preferred embodiment, this invention employs multiprocessor integrated circuit 100. This preferred embodiment includes plural identical processors. Each of these processors will be called a digital image/graphics processor. This description is a matter of convenience only. The processor embodying this invention can be a processor separately fabricated on a single integrated circuit or a plurality of integrated circuits. If embodied on a single integrated circuit, this single integrated circuit may optionally also include read only memory and random access memory used by the digital image/graphics processor.

Figure 2:
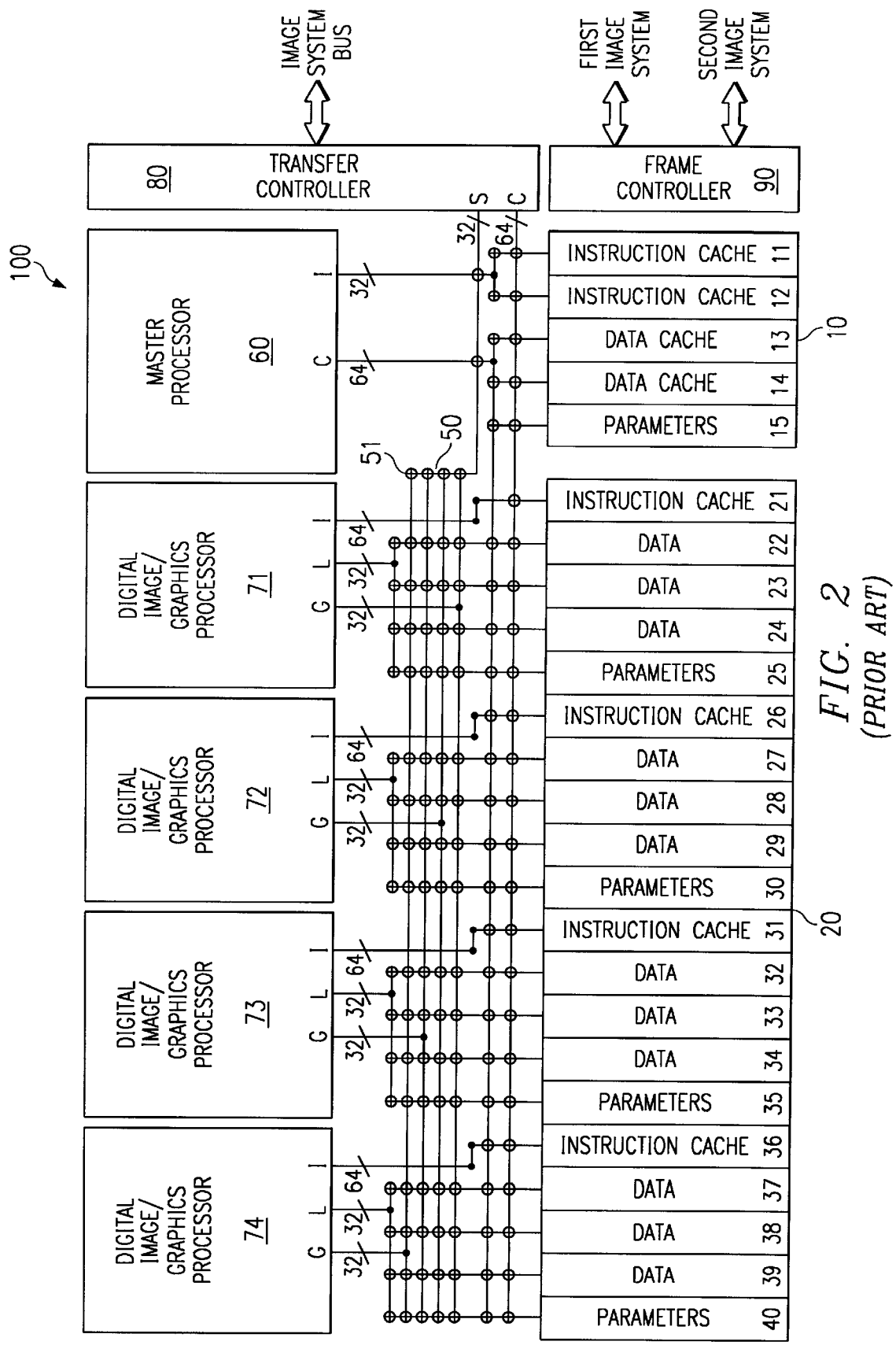
FIG. 2 illustrates the architecture of a prior art single integrated circuit multiprocessor employed in the preferred embodiment of this invention.

FIG. 2 illustrates the architecture of the prior art multiprocessor integrated circuit 100 of the preferred embodiment of this invention. Additional details of this prior art integrated circuit manufactured by Texas Instruments Incorporated and designated TMS320C80 are disclosed in: U.S. Pat. No. 5,197,140, issued Mar. 23, 1993 and entitled SLICED ADDRESSING MULTI-PROCESSOR AND METHOD OF OPERATION; and U.S. Pat. No. 5,420,809, issued May 30, 1995 and entitled METHOD, APPARATUS AND SYSTEM METHOD FOR CORRELATION. Multiprocessor integrated circuit 100 includes: two random access memories 10 and 20, each of which is divided into plural sections; crossbar 50; master processor 60; digital image/graphics processors 71, 72, 73 and 74; transfer controller 80, which mediates access to system memory; and frame controller 90, which can control access to independent first and second image memories. Multiprocessor integrated circuit 100 provides a high degree of operation parallelism, which will be useful in image processing and graphics operations, such as in the multi-media computing.

Multiprocessor integrated circuit 100 includes two random access memories. Random access memory 10 is primarily devoted to master processor 60. It includes two instruction cache memories 11 and 12, two data cache memories 13 and 14 and a parameter memory 15. These memory sections can be physically identical, but connected and used differently. Random access memory 20 may be accessed by master processor 60 and each of the digital image/graphics processors 71, 72, 73 and 74. Each digital image/graphics processor 71, 72, 73 and 74 has five corresponding memory sections. These include an instruction cache memory, three data memories and one parameter memory. Thus digital image/graphics processor 71 has corresponding instruction cache memory 21, data memories 22, 23, 24 and parameter memory 25; digital image/graphics processor 72 has corresponding instruction cache memory 26, data memories 27, 28, 29 and parameter memory 30; digital image/graphics processor 73 has corresponding instruction cache memory 31, data memories 32, 33, 34 and parameter memory 35; and digital image/graphics processor 74 has corresponding instruction cache memory 36, data memories 37, 38, 39 and parameter memory 40. Like the sections of random access memory 10, these memory sections can be physically identical but connected and used differently. Each of these memory sections of memories 10 and 20 preferably includes 2 K bytes, with a total memory within multiprocessor integrated circuit 100 of 50 K bytes.

Multiprocessor integrated circuit 100 is constructed to provide a high rate of data transfer between processors and memory using plural independent parallel data transfers. Crossbar 50 enables these data transfers. Each digital image/graphics processor 71, 72, 73 and 74 has three memory ports that may operate simultaneously each cycle. An instruction port (I) may fetch 64 bit data words from the corresponding instruction cache. A local data port. (L) may read a 32 bit data word from or write a 32 bit data word into the data memories or the parameter memory corresponding to that digital image/graphics processor. A global data port (G) may read a 32 bit data word from or write a 32 bit data word into any of the data memories or the parameter memories of random access memory 20. Master Processor 60 includes two memory ports. An instruction port (I) may fetch a 32 bit instruction word from either of the instruction caches 11 and 12. A data port (C) may read a 32 bit data word from or write a 32 bit data word into data caches 13 or 14, parameter memory 15 of random access memory 10 or any of the data memories, or any of the parameter memories of random access memory 20. Transfer controller 80 can access any of the sections of random access memory 10 or 20 via data port (C). Thus fifteen parallel memory accesses may be requested at any single memory cycle. Random access memories 10 and 20 are divided into 25 memories in order to support so many parallel accesses.

Crossbar 50 controls the connections of master processor 60, digital image/graphics processors 71, 72, 73 and 74, and transfer controller 80 with memories 10 and 20. Crossbar 50 includes a plurality of crosspoints 51 disposed in rows and columns. Each column of crosspoints 51 corresponds to a single memory section and a corresponding range of addresses. A processor requests access to one of the memory sections through the most significant bits of an address output by that processor. This address output by the processor travels along a row. The crosspoint 51 corresponding to the memory section having that address responds either by granting or denying access to the memory section. If no other processor has requested access to that memory section during the current memory cycle, then the crosspoint 51 grants access by coupling the row and column. This supplies the address to the memory section. The memory section responds by permitting data access at that address. This data access may be either a data read operation or a data write operation.

If more than one processor requests access to the same memory section simultaneously, then crossbar 50 grants access to only one of the requesting processors. The crosspoints 51 in each column of crossbar 50 communicate and grant access based upon a priority hierarchy. If two requests for access having the same rank occur simultaneously, then crossbar 50 grants access on a round robin basis, with the processor last granted access having the lowest priority. Each granted access lasts as long as needed to service the request. The processors may change their addresses every memory cycle, so crossbar 50 can change the interconnection between the processors and the memory sections on a cycle by cycle basis.

Master processor 60 preferably performs the major control functions for multiprocessor integrated circuit 100. Master processor 60 is preferably a 32 bit reduced instruction set computer (RISC) processor including a hardware floating point calculation unit. According to the RISC architecture, all accesses to memory are performed with load and store instructions and most integer and logical operations are performed on registers in a single cycle. The floating point calculation unit, however, will generally take several cycles to perform operations when employing the same register file as used by the integer and logical unit. A register score board ensures that correct register access sequences are maintained. The RISC architecture is suitable for control functions in image processing. The floating point calculation unit permits rapid computation of image rotation functions, which may be important to image processing.

Master processor 60 fetches instruction words from instruction cache memory 11 or instruction cache memory 12. Likewise, master processor 60 fetches data from either data cache 13 or data cache 14. Since each memory section includes 2 K bytes of memory, there is 4 K bytes of instruction cache and 4 K bytes of data cache. Cache control is an integral function of master processor 60. As previously mentioned, master processor 60 may also access other memory sections via crossbar 50.

Figure 3:
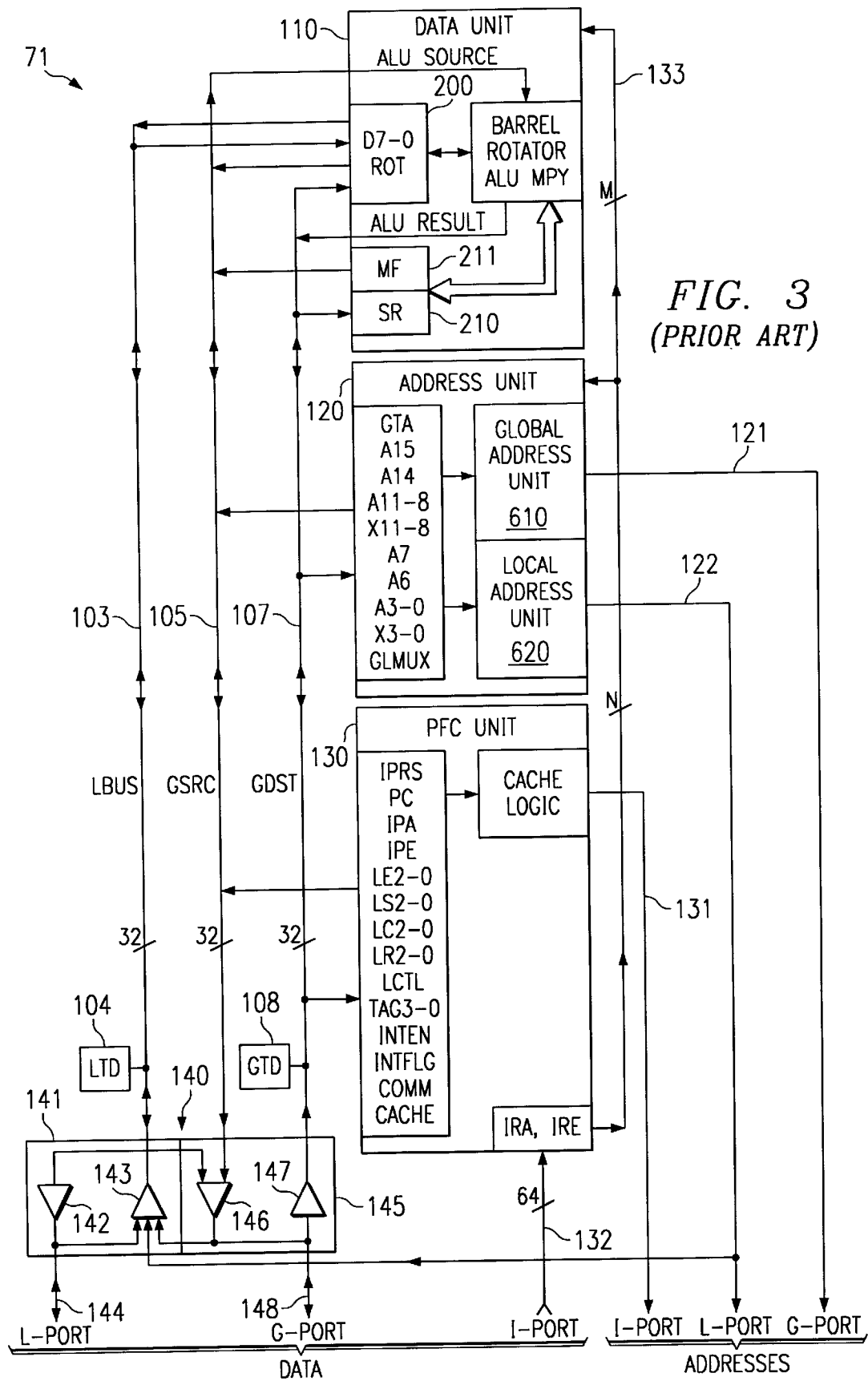
FIG. 3 illustrates in block diagram form one of the prior art digital image/graphics processors illustrated in FIG. 2.

The four digital image/graphics processors 71, 72, 73 and 74 each have a highly parallel digital signal processor (DSP) architecture. FIG. 3 illustrates an overview of exemplary digital image/graphics processor 71, which is identical to digital image/graphics processors 72, 73 and 74. Digital image/graphics processor 71 achieves a high degree of parallelism of operation employing three separate units: data unit 110; address unit 120; and program flow control unit 130. These three units operate simultaneously on different instructions in an instruction pipeline. In addition each of these units contains internal parallelism.

The digital image/graphics processors 71, 72, 73 and 74 can execute independent instruction streams in the multiple instruction multiple data mode (MIMD). In the MIMD mode, each digital image/graphics processor executes an individual program from its corresponding instruction cache, which may be independent or cooperative. In the latter case crossbar 50 enables inter-processor communication in combination with the shared memory. Digital image/graphics processors 71, 72, 73 and 74 may also operate in a synchronized MIMD mode. In the synchronized MIMD mode, the program control flow unit 130 of each digital image/graphics processor inhibits fetching the next instruction until all synchronized processors are ready to proceed. This synchronized MIMD mode allows the separate programs of the digital image/graphics processors to be executed in lock step in a closely coupled operation.

Digital image/graphics processors 71, 72, 73 and 74 can execute identical instructions on differing data in the single instruction multiple data mode (SIMD). In this mode a single instruction stream for the four digital image/graphics processors comes from instruction cache memory 21. Digital image/graphics processor 71 controls the fetching and branching operations and crossbar 50 supplies the same instruction to the other digital image/graphics processors 72, 73 and 74. Since digital image/graphics processor 71 controls instruction fetch for all the digital image/graphics processors 71, 72, 73 and 74, the digital image/graphics processors are inherently synchronized in the SIMD mode.

Transfer controller 80 is a combined direct memory access (DMA) machine and memory interface for multiprocessor integrated circuit 100. Transfer controller 80 intelligently queues, sets priorities and services the data requests and cache misses of the five programmable processors. Master processor 60 and digital image/graphics processors 71, 72, 73 and 74 all access memory and systems external to multiprocessor integrated circuit 100 via transfer controller 80. Data cache or instruction cache misses are automatically handled by transfer controller 80. The cache service (S) port transmits such cache misses to transfer controller 80. Cache service port (S) reads information from the processors and not from memory. Master processor 60 and digital image/graphics processors 71, 72, 73 and 74 may request data transfers from transfer controller 80 as linked list packet requests. These linked list packet requests allow multi-dimensional blocks of information to be transferred between source and destination memory addresses, which can be within multiprocessor integrated circuit 100 or external to multiprocessor integrated circuit 100. Transfer controller 80 preferably also includes a refresh controller for dynamic random access memory (DRAM) which require periodic refresh to retain their data.

Frame controller 90 is the interface between multiprocessor integrated circuit 100 and external image capture and display systems. Frame controller 90 provides control over capture and display devices, and manages the movement of data between these devices and memory automatically. To this end, frame controller 90 provides simultaneous control over two independent image systems. These would typically include a first image system for image capture and a second image system for image display, although the application of frame controller 90 is controlled by the user. These image systems would ordinarily include independent frame memories used for either frame grabber or frame buffer storage. Frame controlled 90 preferably operates to control video dynamic random access memory (VRAM) through refresh and shift register control.

Multiprocessor integrated circuit 100 is designed for large scale image processing. Master processor 60 provides embedded control, orchestrating the activities of the digital image/graphics processors 71, 72, 73 and 74, and interpreting the results that they produce. Digital image/graphics processors 71, 72, 73 and 74 are well suited to pixel analysis and manipulation. If pixels are thought of as high in data but low in information, then in a typical application digital image/graphics processors 71, 72, 73 and 74 might well examine the pixels and turn the raw data into information. This information can then be analyzed either by the digital image/graphics processors 71, 72, 73 and 74 or by master processor 60. Crossbar 50 mediates inter-processor communication. Crossbar 50 allows multiprocessor integrated circuit 100 to be implemented as a shared memory system. Message passing need not be a primary form of communication in this architecture. However, messages can be passed via the shared memories. Each digital image/graphics processor, the corresponding section of crossbar 50 and the corresponding sections of memory 20 have the same width. This permits architecture flexibility by accommodating the addition or removal of digital image/graphics processors and corresponding memory modularly while maintaining the same pin out.

In the preferred embodiment all parts of multiprocessor integrated circuit 100 are disposed on a single integrated circuit. In the preferred embodiment, multiprocessor integrated circuit 100 is formed in complementary metal oxide semiconductor (CMOS) using feature sizes of 0.6 m. Multiprocessor integrated circuit 100 is preferably constructed in a pin grid array package having 256 pins. The inputs and outputs are preferably compatible with transistor-transistor logic (TTL) logic voltages. Multiprocessor integrated circuit 100 preferably includes about 3 million transistors and employs a clock rate of 50 MHZ.

FIG. 3 illustrates an overview of exemplary digital image/graphics processor 71, which is virtually identical to digital image/graphics processors 72, 73 and 74. Digital image/graphics processor 71 includes: data unit 110; address unit 120; and program flow control unit 130. Data unit 110 performs the logical or arithmetic data operations. Data unit 110 includes eight data registers D7–D0, a status register 210 and a multiple flags register 211. Address unit 120 controls generation of load/store addresses for the local data port and the global data port. As will be further described below, address unit 120 includes two virtually identical addressing units, one for local addressing and one for global addressing. Each of these addressing units includes an all "0" read only register enabling absolute addressing in a relative address mode, a stack pointer, five address registers and three index registers. The addressing units share a global bit multiplex control register used when forming a merging address from both address units. Program flow control unit 130 controls the program flow for the digital image/graphics processor 71 including generation of addresses for instruction fetch via the instruction port. Program flow control unit 130 includes; a program counter PC 701; an instruction pointer-address stage IRA 702 that holds the address of the instruction currently in the address pipeline stage; an instruction pointer-execute stage IRE 703 that holds the address of the instruction currently in the execute pipeline stage; an instruction pointer-return from subroutine IPRS 704 holding the address for returns from subroutines; a set of registers controlling zero overhead loops; four cache tag registers TAG3–TAG0 collectively called 708 that hold the most significant bits of four blocks of instruction words in the corresponding instruction cache memory.

Figure 4:
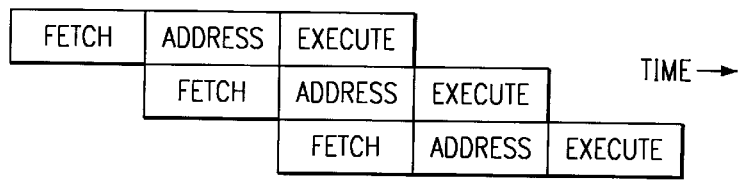
FIG. 4 illustrates in schematic form the pipeline stages of operation of the prior art digital image/graphics processor illustrated in FIG. 2.

Digital image/graphics processor 71 operates on a three stage pipeline as illustrated in FIG. 4. Data unit 110, address unit 120 and program flow control unit 130 operate simultaneously on different instructions in an instruction pipeline. The three stages in chronological order are fetch, address and execute. Thus at any time, digital image/graphics processor 71 will be operating on differing functions of three instructions. The phrase pipeline stage is used instead of referring to clock cycles, to indicate that specific events occur when the pipeline advances, and not during stall conditions.

Program flow control unit 130 performs all the operations that occur during the fetch pipeline stage. Program flow control unit 130 includes a program counter, loop logic, interrupt logic and pipeline control logic. During the fetch pipeline stage, the next instruction word is fetched from memory. The address contained in the program counter is compared with cache tag registers to determine if the next instruction word is stored in instruction cache memory 21. Program flow control unit 130 supplies the address in the program counter to the instruction port address bus 131 to fetch this next instruction word from instruction cache memory 21 if present. Crossbar 50 transmits this address to the corresponding instruction cache, here instruction cache memory 21, which returns the instruction word on the instruction bus 132. Otherwise, a cache miss occurs and transfer controller 80 accesses external memory to obtain the next instruction word. The program counter is updated. If the following instruction word is at the next sequential address, program control flow unit 130 post increments the program counter. Otherwise, program control flow unit 130 loads the address of the next instruction word according to the loop logic or software branch. If the synchronized MIMD mode is active, then the instruction fetch waits until all the specified digital image/graphics processors are synchronized, as indicated by sync bits in a communications register.

Address unit 120 performs all the address calculations of the address pipeline stage. Address unit 120 includes two independent address units, one for the global port and one for the local port. If the instruction calls for one or two memory accesses, then address unit 120 generates the address(es) during the address pipeline stage. The address (es) are supplied to crossbar 50 via the respective global port address bus 121 and local port address bus 122 for contention detection/prioritization. If there is no contention, then the accessed memory prepares to allow the requested access, but the memory access occurs during the following execute pipeline stage.

Data unit 110 performs all of the logical and arithmetic operations during the execute pipeline stage. All logical and arithmetic operations and all data movements to or from memory occur during the execute pipeline stage. The global data port and the local data port complete any memory accesses, which are begun during the address pipeline stage, during the execute pipeline stage. The global data port and the local data port perform all data alignment needed by memory stores, and any data extraction and sign extension needed by memory loads. If the program counter is specified as a data destination during any operation of the execute pipeline stage, then a delay of two instructions is experienced before any branch takes effect. The pipelined operation requires this delay, since the next two instructions following such a branch instruction have already been fetched. According to the practice in RISC processors, other useful instructions may be placed in the two delay slot positions.

Digital image/graphics processor 71 includes three internal 32 bit data busses. These are local port data bus Lbus 103, global port source data bus Gsrc 105 and global port destination data bus Gdst 107. These three buses interconnect data unit 110, address unit 120 and program flow control unit 130. These three buses are also connected to a data port unit 140 having a local port 141 and global port 145. Data port unit 140 is coupled to crossbar 50 providing memory access.

Local data port 141 has a buffer 142 for data stores to memory. A multiplexer/buffer circuit 143 loads data onto Lbus 103 from local port data bus 144 from memory via crossbar 50, from a local port address bus 122 or from global port data bus 148. Local port data bus Lbus 103 thus carries 32 bit data that is either register sourced (stores) or memory sourced (loads). Advantageously, arithmetic results in address unit 120 can be supplied via local port address bus 122, multiplexer buffer 143 to local port data bus Lbus 103 to supplement the arithmetic operations of data unit 110. Buffer 142 and multiplexer buffer 143 perform alignment and extraction of data. Local port data bus Lbus 103 connects to data registers in data unit 110. A local bus temporary holding register LTD 104 is also connected to local port data Lbus 103.

Global port source data bus Gsrc 105 and global port destination data bus Gdst 107 mediate global data transfers. These global data transfers may be either memory accesses, register to register moves or command word transfers between processors. Global port source data bus Gsrc 105 carries 32 bit source information of a global port data transfer. The data source can be any of the registers of digital image/graphics processor 71 or any data or parameter memory corresponding to any of the digital image/graphics processors 71, 72, 73 or 74. The data is stored to memory via the global port 145. Multiplexer buffer 146 selects lines from local port data Lbus 103 or global port source data bus Gsrc 105, and performs data alignment. Multiplexer buffer 146 writes this data onto global port data bus 148 for application to memory via crossbar 50. Global port source data bus Gsrc 105 also supplies data to data unit 110, allowing the data of global port source data bus Gsrc 105 to be used as one of the arithmetic logic unit sources. This latter connection allows any register of digital image/graphics processor 71 to be a source for an arithmetic logic unit operation.

Global port destination data bus Gdst 107 carries 32 bit destination data of a global bus data transfer. The destination is any register of digital image/graphics processor 71. Buffer 147 in global port 145 sources the data of global port destination data bus Gdst 107. Buffer 147 performs any needed data extraction and sign extension operations. This buffer 147 operates if the data source is memory, and a load is thus being performed. The arithmetic logic unit result serves as an alternative data source for global port destination data bus Gdst 107. This allows any register of digital image/graphics processor 71 to be the destination of an arithmetic logic unit operation. A global bus temporary holding register GTD 108 is also connected to global port destination data bus Gdst 107.

Circuitry including multiplexer buffers 143 and 146 connect between global port source data bus Gsrc 105 and global port destination data bus Gdst 107 to provide register to register moves. This allows a read from any register of digital image/graphics processor 71 onto global port source data bus Gsrc 105 to be written to any register of digital image/graphics processor 71 via global port destination data bus Gdst 107.

Note that it is advantageously possible to perform a load of any register of digital image/graphics processor 71 from memory via global port destination data bus Gdst 107, while simultaneously sourcing the arithmetic logic unit in data unit 110 from any register via global port source data bus Gsrc 105. Similarly, it is advantageously possible to store the data in any register of digital image/graphics processor 71 to memory via global port source data bus Gsrc 105, while saving the result of an arithmetic logic unit operation to any register of digital image/graphics processor 71 via global port destination data bus Gdst 107. The usefulness of these data transfers will be further detailed below.

Program flow control unit 130 receives the instruction words fetched from instruction cache memory 21 via instruction bus 132. This fetched instruction word is advantageously stored in two 64 bit instruction registers designated instruction register-address stage IRA 751 and instruction register-execute stage IRE 752. Each of the instruction registers IRA and IRE have their contents decoded and distributed. Digital image/graphics processor 71 includes opcode bus 133 that carries decoded or partially decoded instruction contents to data unit 110 and address unit 120. As will be later described, an instruction word may include a 32 bit, a 15 bit or a 3 bit immediate field. Program flow control unit 130 routes such an immediate field to global port source data bus Gsrc 105 for supply to its destination.

Digital image/graphics processor 71 includes three address buses 121, 122 and 131. Address unit 120 generates addresses on global port address bus 121 and local port address bus 122. As will be further detailed below, address unit 120 includes separate global and local address units, which provide the addresses on global port address bus 121 and local port address bus 122, respectively. Note that local address unit 620 may access memory other than the data memory corresponding to that digital image/graphics processor. In that event the local address unit access is via global port address bus 121. Program flow control unit 130 sources the instruction address on instruction port address bus 131 from a combination of address bits from a program counter and cache control logic. These address buses 121, 122 and 131 each carry address, byte strobe and read/write information.

Figure 5:
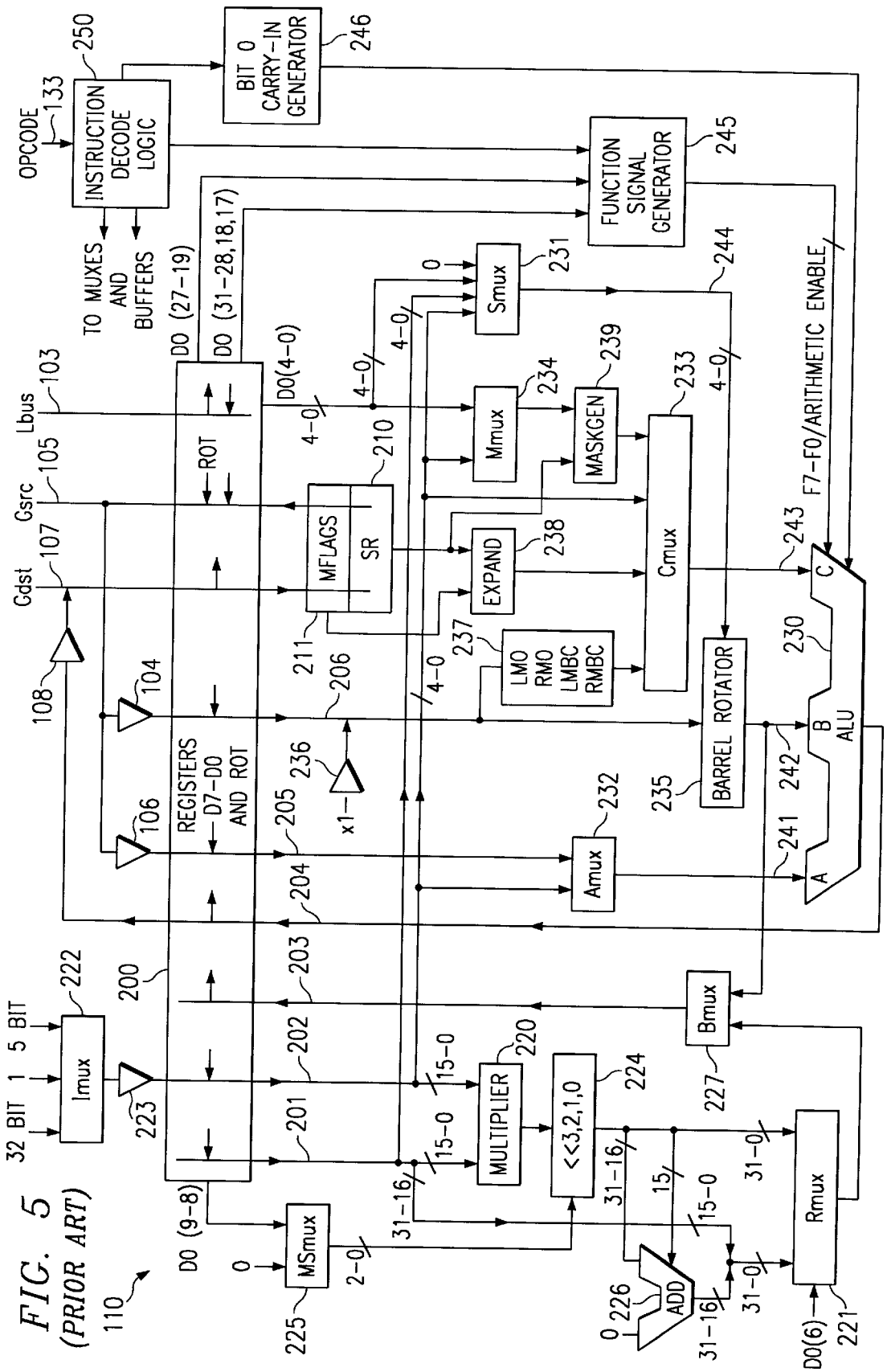
FIG. 5 illustrates in block diagram form the prior art data unit of the digital image/graphics processors illustrated in FIG. 3.

FIG. 5 illustrates details of data unit 110. Data unit 110 includes a number of parts advantageously operating in parallel. Data unit 110 includes eight 32 bit data registers 200 designated D7–D0. Data register D0 may be used as a general purpose register but in addition has special functions when used with certain instructions. Data registers 200 include multiple read and write ports connected to data unit buses 201 to 206 and to local port data bus Lbus 103, global port source data bus Gsrc 105 and global port destination data bus Gdst 107. Data unit 110 further includes a status register 210 and a multiple flags register 211, which stores arithmetic logic unit resultant status for use in certain instructions. Data unit 110 includes as its major computational components a hardware multiplier 220 and a three input arithmetic logic unit 230. Lastly, data unit 110 includes: multiplier first input bus 201, multiplier second input bus 202, multiplier destination bus 203, arithmetic logic unit destination bus 204, arithmetic logic unit first input bus 205, arithmetic logic unit second input bus 206; buffers 104, 106, 108 and 236; multiplexers Rmux 221, Imux 222, MSmux 225, Bmux 227, Amux 232, Smux 231, Cmux 233 and Mmux 234; and product left shifter 224, adder 226, barrel rotator 235, LMO/RMO/LMBC/RMBC circuit 237, expand circuit 238, mask generator 239, input A bus 241, input B bus 242, input C bus 243, rotate bus 244, function signal generator 245, bit 0 carry-in generator 246, and instruction decode logic 250, all of which will be further described below.

Figure 6:
FIG. 6 illustrates in schematic form field definitions of the prior art status register of the data unit illustrated in FIG. 5.

FIG. 6 illustrates the field definitions for status register 210. Status register 210 may be read from via global port source data bus Gsrc 105 or written into via global port destination data bus Gdst bus 107. In addition, status register 210 may write to or load from a specified one of data registers 200. Status register 210 stores four arithmetic logic unit result status bits "N", "C", "V" and "Z". These are individually described below, but collectively their setting behavior is as follows. Note that the instruction types listed here will be fully described below. For instruction words including a 32 bit immediate fields, if the condition code field is "unconditional" then all four status bits are set according to the result of arithmetic logic unit 230. If the condition code field specifies a condition other than "unconditional", then no status bits are set, whether or not the condition is true. The instruction word may indicate which status bits should be protected. All unprotected bits are set according to the result of arithmetic logic unit 230.

The "N" bit (bit 31) stores an indication of a negative result. The "N" bit is set to "1" if the result of the last operation of arithmetic logic unit 230 was negative. This bit is loaded with bit 31 of the result. In a multiple arithmetic logic unit operation, which will be explained below, the "N" bit is set to the AND of the zero compares of the plural sections of arithmetic logic unit 230. In a bit detection operation performed by LMO/RMO/LMBC/RMBC circuit 237, the "N" bit is set to the AND of the zero compares of the plural sections of arithmetic logic unit 230. Writing to this bit in software overrides the normal arithmetic logic unit result writing logic.

The "C" bit (bit 30) stores an indication of a carry result. The "C" bit is set to "1" if the result of the last operation of arithmetic logic unit 230 caused a carry-out from bit 31 of the arithmetic logic unit. During multiple arithmetic and bit detection, the "C" bit is set to the OR of the carry outs of the plural sections of arithmetic logic unit 230. Thus the "C" bit is set to "1" if at least one of the sections has a carry out. Writing to this bit in software overrides the normal arithmetic logic unit result writing logic.

The "V" bit (bit 29) stores an indication of an overflow result. The "V" bit is set to "1" if the result of the last operation of arithmetic logic unit 230 created an overflow condition. This bit is loaded with the exclusive OR of the carry-in and carry-out of bit 31 of the arithmetic logic unit 230. During multiple arithmetic logic unit operation the "V" bit is the AND of the carry outs of the plural sections of arithmetic logic unit 230. For left most one and right most one bit detection, the "V" bit is set to "1" if there were no "1's" in the input word, otherwise the "V" bit is set to "0". For left most bit change and right most bit change bit detection, the "V" bit is set to "1" is all the bits of the input are the same, or else the "V" bit is set to "0". Writing to this bit in software overrides the normal arithmetic logic unit result writing logic.

The "Z" bit (bit 28) stores and indication of a "0" result. The "Z" bit is set to "1" if the result of the last operation of arithmetic logic unit 230 produces a "0" result. This "Z" bit is controlled for both arithmetic operations and logical operations. In multiple arithmetic and bit detection operations, the "Z" bit is set to the OR of the zero compares of the plural sections of arithmetic logic unit 230. Writing to this bit in software overrides the normal arithmetic logic unit result writing logic circuitry.

The "R" bit (bit 6) controls bits used by expand circuit 238 and rotation of multiple flags register 211 during instructions that use expand circuit 238 to expand portions of multiple flags register 211. If the "R" bit is "1", then the bits used in an expansion of multiple flags register 211 via expand circuit 238 are the most significant bits. For an operation involving expansion of multiple flags register 211 where the arithmetic logic unit function modifier does not specify multiple flags register rotation, then multiple flags register 211 is "post-rotated left" according to the "Msize" field. If the "R" bit is "0", then expand circuit 238 employs the least significant bits of multiple flags register 211.

The "Msize" field (bits 3 to 5) indicates the data size employed in certain instruction classes that supply mask data from multiple flags register 211 to the C-port of arithmetic logic unit 230. The "Msize" field determines how many bits of multiple flags register 211 uses to create the mask information.

The "Asize" field (bits 0 to 2) indicates the data size for multiple operations performed by arithmetic logic unit 230. Arithmetic logic unit 230 preferably includes 32 parallel bits. During certain instructions arithmetic logic unit 230 splits into multiple independent sections. This is called a multiple arithmetic logic unit operation. This splitting of arithmetic logic unit 230 permits parallel operation on pixels of less than 32 bits that are packed into 32 bit data words. In the preferred embodiment arithmetic logic unit 230 supports: a single 32 bit operation; two sections of 16 bit operations; and four sections of 8 bit operations. These options are called word, half-word and byte operations.

The "Asize" field indicates: the number of multiple sections of arithmetic logic unit 230; the number of bits of multiple flags register bits 211 set during the arithmetic logic unit operation, which is equal in number to the number of sections of arithmetic logic unit 230; and the number of bits the multiple flags register should "post-rotate left" after output during multiple arithmetic logic unit operation.

The multiple flags register 211 is a 32 bit register that provides mask information to the C-port of arithmetic logic unit 230 for certain instructions. Global port destination data bus Gdst bus 107 may write to multiple flags register 211. Global port source bus Gsrc may read data from multiple flags register 211. In addition multiple arithmetic logic unit operations may write to multiple flags register 211. In this case multiple flags register 211 records either the carry or zero status information of the independent sections of arithmetic logic unit 230. The instruction executed controls whether the carry or zero is stored.

The "Msize" field of status register 210 controls the number of least significant bits used from multiple flags register 211. The "R" bit of status register 210 controls whether multiple flags register 211 is pre-rotated left prior to supply of these bits. The value of the "Msize" field determines the amount of rotation if the "R", bit is "1". The selected data supplies expand circuit 238, which generates a 32 bit mask as detailed below.

The "Asize" field of status register 210 controls the data stored in multiple flags register 211 during multiple arithmetic logic unit operations. As previously described, in the preferred embodiment arithmetic logic unit 230 may be used in one, two or four separate sections employing data of 32 bits, 16 bits and 8 bits, respectively. Upon execution of a multiple arithmetic logic unit operation, the "Asize" field indicates through the defined data size the number of bits of multiple flags register 211 used to record the status information of each separate result of the arithmetic logic unit. Note that the previous discussion referred to storing either carry or zero status in multiple flags register 211. It is also feasible to store other status bits such as negative and overflow.

Multiple flags register 211 may be rotated left a number of bit positions upon execution of each arithmetic, logic unit operation. The rotate amount is given above. When performing multiple arithmetic logic unit operations, the result status bit setting dominates over the rotate for those bits that are being set. When performing multiple arithmetic logic unit operations, an alternative to rotation is to clear all the bits of multiple flags register 211 not being set by the result status. This clearing is after generation of the mask data if mask data is used in that instruction. If multiple flags register 211 is written by software at the same time as recording an arithmetic logic unit result, then the preferred operation is for the software write to load all the bits. Software writes thus dominate over rotation and clearing of multiple flags register 211.

Arithmetic logic unit 230 may be split into multiple sections. The 32 bits of arithmetic logic unit 230 are separated into two sections of 16 bits each or four sections of eight bits each. This is accomplished by control of multiplexers in the carry path between respective eight bit sections of arithmetic logic unit 230. These multiplexers are controlled based upon the selected data size. In the normal case arithmetic logic unit 230 operates on 32 bit data words. This is indicated by an "Asize" field of status register 210 equal to "110". If status register 210 selected a half-word via an "Asize" field of "101", then these multiplexers separated into two 16 bit sections. If status register 210 selected a byte via an "Asize" field of "100", then these multiplexers separate into four independent 8 bit units. Carry output and zero detection are also based upon the selected data size.

During multiple arithmetic logic unit operations multiple flags register 211 may store either carry-outs or the zero comparison, depending on the instruction. These stored resultants control masks to the C-port during later operations. In the case in which multiple flags register 211 stores the carry-out signal(s), the "Asize" field of status register 210 determines the identity and number of carry-out signals stored. The "Asize" field similarly controls the number and identity of zero resultants stored in multiple flags register 211 when storage of zero resultants is selected.

Data registers 200, designated data registers D7–D0 are connected to local port data bus Lbus 103, global port source data bus Gsrc 105 and global port destination data bus Gdst 107. Arrows within the rectangle representing data registers 200 indicate the directions of data access. A left pointing arrow indicates data recalled from data registers 200. A right pointing arrow indicates data written into data registers 200. Local port data bus Lbus 103 is bidirectionally coupled to data registers 200 as a data source or data destination. Global port destination data bus Gdst 107 is connected to data registers 200 as a data source for data written into data registers 200. Global port source data bus Gsrc 107 is connected to data registers 200 as a data destination for data recalled from data registers 200. Status register 210 and multiple flags register 211 may be read from via global port source data bus Gsrc 106 and written into via global port destination data bus Gdst 107. Data registers 200 supply data to multiplier first input bus 201, multiplier second input bus 202, arithmetic logic unit first input bus 205 and arithmetic logic unit second input bus 206. Data registers 200 are connected to receive input data from multiplier destination bus 203 and arithmetic logic unit destination bus 204.

Figure 7:
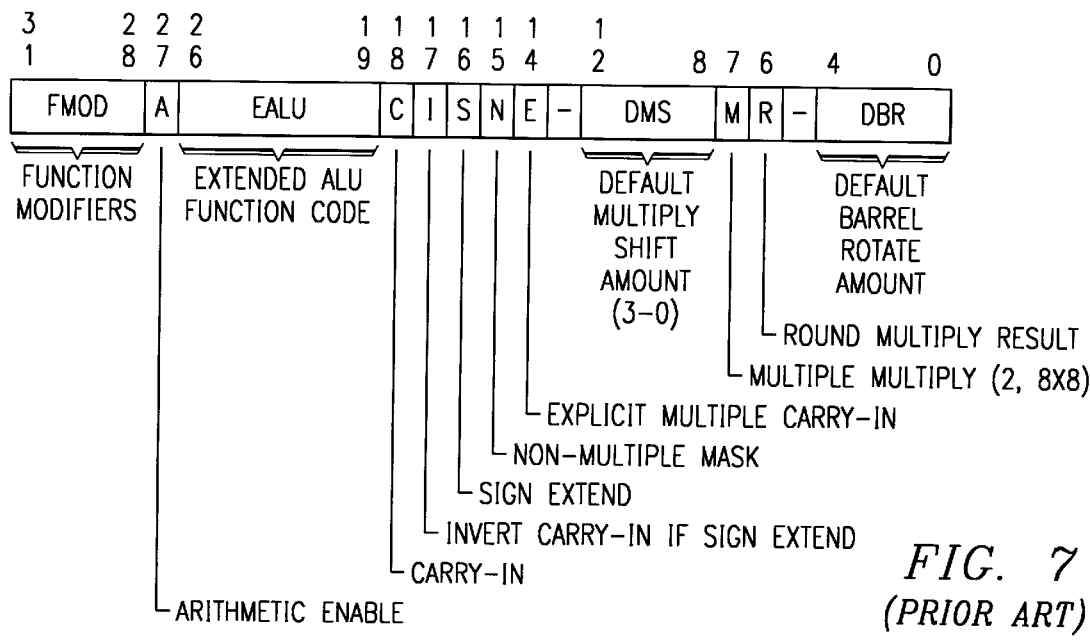
FIG. 7 illustrates in schematic form the field definitions of the prior art first data register of the data unit illustrated in FIG. 5.

FIG. 7 illustrates the contents of data register D0 when specifying data unit 110 operation. The data register D0 has a dual function. It may be used as a normal data register in the same manner as the other data registers D7–D1. Data register D0 may also define certain special functions when executing some instructions. Some of the bits of the most significant half-word of data register D0 specifies the operation of all types of extended arithmetic logic unit operations. Some of the bits of the least significant half-word of data register D0 specifies multiplier options during a multiple multiply operation. The 5 least significant bits of data register D0 specify a default barrel rotate amount used by certain instruction classes.

The "FMOD" field (bits 28 to 31) allow modification of the basic operation of arithmetic logic unit 230 when executing an instruction calling for an extended arithmetic logic unit (EALU) operation. Table 1 illustrates these modifier options. Note, as indicated in Table 1, certain instruction word bits in some instruction formats are decoded as function modifiers in the same fashion.

TABLE 1

| Function Modifier Code | Modification Performed |
|---|---|
| 0 0 0 0 | normal operation |
| 0 0 0 1 | cio |
| 0 0 1 0 | % ! if mask generation instruction<br>LMO if not mask generation instruction |
| 0 0 1 1 | (% ! and cio) if mask generation instruction<br>RMO if not mask generation instruction |
| 0 1 0 0 | A-port = 0 |
| 0 1 0 1 | A-port = 0 and cio |
| 0 1 1 0 | (A-port = 0 and % !) if mask generation instruction<br>LMBC if not mask generation instruction |
| 0 1 1 1 | (A-port = 0 and % ! and cio) if mask generation instruction<br>RMBC if not mask generation instruction |
| 1 0 0 0 | Multiple arithmetic logic unit operations,<br>carry-out (s) --> multiple flags register |
| 1 0 0 1 | Multiple arithmetic logic unit operations,<br>zero result (s) --> multiple flags register |
| 1 0 1 0 | Multiple arithmetic logic unit operations,<br>carry-out (s) --> multiple flags register,<br>rotate by "Asize" field of status register |
| 1 0 1 1 | Multiple arithmetic logic unit operations,<br>zero result (s) --> multiple flags register,<br>rotate by "Asize" field of status register |
| 1 1 0 0 | Multiple arithmetic logic unit operations,<br>carry-out (s) --> multiple flags register,<br>clear multiple flags register |
| 1 1 0 1 | Multiple arithmetic logic unit operations,<br>zero result (s) --> multiple flags register,<br>clear multiple flags register |
| 1 1 1 0 | Reserved |
| 1 1 1 1 | Reserved |

```
Instruction word bit      Data Register D0 bit
        52 ——————————————— 28
        54 ——————————————— 29
        56 ——————————————— 30
        58 ——————————————— 31
```

The modified operations listed in Table 1 are explained below. If the "FMOD" field is "0000", the normal, unmodified operation results. The modification "cio" causes the carry-in to bit 0 of arithmetic logic unit 230 to be the "C" bit of status register 210. This allows add with carry, subtract with borrow and negate with borrow operations. The modification "%!" works with mask generation. When the "%!" modification is active mask generator 239 effectively generates all "1's" for a zero rotate amount rather than all "0's". This function can be implemented by changing the mask generated by mask generator 239 or by modifying the function of arithmetic logic unit 230 so that mask of all "0's" supplied to the C-port operates as if all "1's" were supplied. This modification is useful in some rotate operations. The modifications "LMO", "RMO", "LMBC" and "RMBC" designate controls of the LMO/RMO/LMBC/RMBC circuit 237. The modification "LMO" finds the left most "1" of the second arithmetic input. The modification "RMO" finds the right most "1". The modification "LMBC" finds the left most bit that differs from the sign bit (bit 31). The "RMBC" modification finds the right most bit that differs from the first bit (bit 0). Note that these modifications are only relevant if the C-port of arithmetic logic unit 230 does not receive a mask from mask generator 239. The modification "A-port= 0" indicates that the input to the A-port of arithmetic logic unit 230 is effectively zeroed. This may take place via multiplexer Amux 232 providing a zero output, or the operation of arithmetic logic unit 230 may be altered in a manner having the same effect. An "A-port=0" modification is used in certain negation, absolute value and shift right operations. A "multiple arithmetic logic unit operation" modification indicates that one or more of the carry paths of arithmetic logic unit 230 are severed, forming in effect two or more independent arithmetic logic units operating in parallel. The "Asize" field of status register 210 controls the number of such multiple arithmetic logic unit sections. The multiple flags register 211 stores a number of status bits equal to the number of sections of the multiple arithmetic logic unit operations. In the "carry-out(s)→multiple flags" modification, the carry-out bit or bits are stored in multiple flags register 211. In the "zero result(s)→multiple flags" modification, an indication of the zero resultant for the corresponding arithmetic logic unit section is stored in multiple flags register 211. This process is described above together with the description of multiple flags register 211. During this storing operation, bits within multiple flags register 211 may be rotated in response to the "rotate" modification or cleared in response to the "clear" modification. These options are discussed above together with the description of multiple flags register 211.

The "A" bit (bit 27) controls whether arithmetic logic unit 230 performs an arithmetic or Boolean logic operation during an extended arithmetic logic unit operation. This bit is called the arithmetic enable bit. If the "A" bit is "1", then an arithmetic operation is performed. If the "A" bit is "0", then a logic operation is performed. If the "A" bit is "0", then the carry-in from bit 0 carry-in generator 246 into bit 0 of the arithmetic logic unit 230 is generally "0".

The "EALU" field (bits 19 to 26) defines an extended arithmetic logic unit operation. The eight bits of the "EALU" field specify the arithmetic logic unit function control bits used in all types of extended arithmetic logic unit operations. These bits become the control signals to arithmetic logic unit 230. They may be passed to arithmetic logic unit 230 directly, or modified according to the "FMOD" field. In some instructions the bits of the "EALU" field are inverted, leading to an "EALUF" or extended arithmetic logic unit false operation. In this case the eight control bits supplied to arithmetic logic unit 230 are inverted.

The "C" bit (bit 18) designates the carry-in to bit 0 of arithmetic logic unit 230 during extended arithmetic logic unit operations. The carry-in value into bit 0 of the arithmetic logic unit during extended arithmetic logic unit operations is given by this "C" bit. This allows the carry-in value to be specified directly, rather than by a formula as for non-EALU operations.

The "I"bit (bit 17) is designated the invert carry-in bit. The "I" bit, together with the "C" bit and the "S" bit (defined below), determines whether or not to invert the carry-in into bit 0 of arithmetic logic unit 230 when the function code of an arithmetic logic unit operation are inverted. This will be further detailed below.

The "S" bit (bit 16) indicates selection of sign extend. The "S" bit is used when executing extended arithmetic logic unit operations ("A" bit=1). If the "S" bit is "1", then arithmetic logic unit control signals F3–F0 (produced from bits 22–19) should be inverted if the sign bit (bit 31) of the data first arithmetic logic unit input bus 206 is "0", and not inverted if this sign bit is "1". This conditionally inverting arithmetic logic unit control signals F3–F0 generally provides a complementary operation. Such an inversion is useful to sign extend a rotated input in certain arithmetic operations. If the extended arithmetic logic unit operation is Boolean ("A" bit=0), then the "S" bit is ignored and the arithmetic logic unit control signals F3–F0 are unchanged.

The "N" bit (bit 15) is used when executing a split or multiple section arithmetic logic unit operation. This "N" bit is called the non-multiple mask bit. For some extended arithmetic logic unit operations that specify multiple operation via the "FMOD" field, the instruction specifies a mask to be passed to the C-port of arithmetic logic unit 230 via mask generator 239. This "N" bit determines whether or not the mask is split into the same number of sections as arithmetic logic unit 230. Recall that the number of such multiple sections is set by the "Asize" field of status register 210. If the "N" bit is "0", then the mask is split into multiple masks. If the "N" bit is "1", then mask generator 239 produces a single 32 bit mask.

The "E" bit (bit 14) designates an explicit multiple carry-in. This bit permits the carry-in to be specified at run time by the input to the C-port of arithmetic logic unit 230. The carry input to each section during multiple arithmetic is taken as the exclusive OR of the least significant bit of the corresponding section input to the C-port and the function signal F0. If multiple arithmetic is not selected the single carry-in to bit 0 of arithmetic logic unit 230 is the exclusive OR of the least significant bit (bit 0) the input to the C-port and the function signal F0.

The "DMS" field (bits 8 to 12) defines the shift following the multiplier. This shift takes place in product left shifter 224 prior to saving the result or passing the result to rounding logic. During this left shift the most significant bits shifted out are discarded and zeroes are shifted into the least significant bits. The "DMS" field is effective during any multiply/extended arithmetic logic unit operation. The "DMS" field includes 5 bits that can designate left shift amounts from 0 to 31 places. In the preferred embodiment product left shifter 224 is limited to shifts from 0 to 3 places for reasons of size and complexity. Thus bits 12–10 of data register D0 are ignored in setting the left shift amount. However, it is feasible to provide a left shift amount within the full range from 0 to 31 places from the "DMS" field if desired.

The "M" bit (bit 7) indicates a multiple multiply operation. Multiplier 220 can multiply two 16 bit numbers to generate a 32 bit result or simultaneously multiply two pair of 8 bit numbers to generate a pair of 16 bit resultants. This "M" bit selects either a single 16 by 16 multiply if "M"="0", or two 8 by 8 multiplies if "M"="1". This operation is similar to multiple arithmetic logic unit operations and will be further described below.

The "R" bit (bit 6) specifies whether a rounding operation takes place on the resultant from multiplier 220. If the "R" bit is "1", the a rounding operation, explained below together with the operation of multiplier 220, takes place. If the "R" bit is "0", then no rounding takes place and the 32 bit resultant form multiplier 220 is written into the destination register. Note that use of a predetermined bit in data register D0 is merely a preferred embodiment for triggering this mode. It is equally feasible to enable the rounding mode via a predetermined instruction word bit.

The "DBR" field (bits 0 to 4) specifies a default barrel rotate amount used barrel rotator 235 during certain instructions. The "DBR" field specifies the number of bit positions that barrel rotator 235 rotates left. These 5 bits can specify a left rotate of 0 to 31 places. The value of the "DBR" field may also be supplied to mask generator 239 via multiplexer Mmux 234. Mask generator 239 forms a mask supplied to the C-port of arithmetic logic unit 230. The operation of mask generator 239 will be discussed below.

Multiplier 220 is a hardware single cycle multiplier. As described above, multiplier 220 operates to multiply a pair of 16 bit numbers to obtain a 32 bit resultant or to multiply two pairs of 8 bit numbers to obtain two 16 bit resultants in the same 32 bit data word.

Multiplier first input bus 201 is a 32 bit bus sourced from a data register within data registers 200 selected by the instruction word. The 16 least significant bits of multiplier first input bus 201 supplies a first 16 bit input to multiplier 220. The 16 most significant bits of multiplier first input bus 201 supplies the 16 least significant bits of a first input to a 32 bit multiplexer Rmux 221. This data routing is the same for both the 16 bit by 16 bit multiply and the dual 8 bit by 8 bit multiply. The 5 least significant bits of multiplier first input bus 201 supply a first input to a multiplexer Smux 231.

Multiplier second input bus 202 is a 32 bit bus sourced from one of the data registers 200 as selected by the instruction word or from a 32 bit, 5 bit or 1 bit immediate value imbedded in the instruction word. A multiplexer Imux 222 supplies such an immediate multiplier second input bus 202 via a buffer 223. The instruction word controls multiplexer Imux 222 to supply either 32 bits, 5 bits or 1 bit from an immediate field of the instruction word to multiplier second input bus 202 when executing an immediate instruction. The short immediate fields are zero extended in multiplexer Imux 222 upon supply to multiplier second input bus 202. The 16 least significant bits of multiplier second input bus 202 supplies a second 16 bit input to multiplier 220. This data routing is the same for both the 16 bit by 16 bit multiply and the dual 8 bit by 8 bit multiply. Multiplier second input bus 202 further supplies one input to multiplexer Amux 232 and one input to multiplexer Cmux 233. The 5 least significant bits of multiplier second input bus 202 supply one input to multiplexer Mmux 234 and a second input to multiplexer Smux 231.

The output of multiplier 220 supplies the input of product left shifter 224. The output of multiply shift multiplexer MSmux 225 controls the amount of left shift of product left shifter 224. Multiply shift multiplexer MSmux 225 selects either the "DMS" field of data register D0 or all zeroes depending on the instruction word. In the preferred embodiment, multiply shift multiplexer MSmux 225 selects the "0" input for the instructions MPYx/ADD and MPYx/SUB. These instructions combine signed or unsigned multiplication with addition or subtractions using arithmetic logical unit 230. In the preferred embodiment, multiply shift multiplexer MSmux 225 selects bits 9–8 of data register D0 for the instructions MPYx/EALUx. These instructions combine signed or unsigned multiplication with one of two types of extended arithmetic logic unit instructions using arithmetic logic unit 230. The operation of data unit 110 when executing these instructions will be further described below. Product left shifter 224 discards the most significant bits shifted out and fills the least significant bits shifted in with zeros. Product left shifter 224 supplies a 32 bit output connected to a second input of multiplexer Rmux 221.

The addition of a small amount of logic the same basic hardware can perform 16 bit by 16 multiplication and dual 8 bit by 8 bit multiplications. The additional hardware consists of multiplexers at the two inputs to the multiplier core, a modification to the Booth re-coder logic and a multiplexer at the output of the multiplier. This additional hardware permits much greater data through put when using dual 8 bit by 8 bit multiplication.

Adder 226 has three inputs. A first input is set to all zeros. A second input receives the 16 most significant bits (bits 31–16) of the left shifted resultant of multiplier 220. A carry-in input receives the output of bit 15 of this left shifter resultant of multiplier 220. Multiplexer Rmux 221 selects either the entire 32 bit resultant of multiplier 220 as shifted by product left shifter 224 to supply to multiply destination bus 203 via multiplexer Bmux 227 or the sum from adder 226 forms the 16 most significant bits and the 16 most significant bits of multiplier first input bus 201 forms the 16 least significant bits. As noted above, in the preferred embodiment the state of the "R" bit of data register D0 controls this selection at multiplexer Rmux 221. If this "R" bit is "0", then multiplexer Rmux 221 selects the shifted 32 bit resultant. If this "R" bit is "1", then multiplexer Rmux 221 selects the 16 rounded bits and the 16 most significant bits of multiplier first input bus 201. Note that it is equally feasible to control multiplexer Rmux 221 via an instruction word bit.

Arithmetic logic unit 230 performs arithmetic and logic operations within data unit 110. Arithmetic logic unit 230 advantageously includes three input ports for performing three input arithmetic and logic operations. Numerous buses and auxiliary hardware supply the three inputs.

Input A bus 241 supplies data to an A-port of arithmetic logic unit 230. Multiplexer Amux 232 supplies data to input A bus 241 from either multiplier second input bus 202 or arithmetic logic unit first input bus 205 depending on the instruction. Data on multiplier second input bus 202 may be from a specified one of data registers 200 or from an immediate field of the instruction via multiplexer Imux 222 and buffer 223. Data on arithmetic logic unit first input bus 205 may be from a specified one of data registers 200 or from global port source data bus Gsrc bus 105 via buffer 106. Thus the data supplied to the A-port of arithmetic logic unit 230 may be from one of the data registers 200, from an immediate field of the instruction word or a long distance source from another register of digital image/graphics processor 71 via global source data bus Gsrc 105 and buffer 106.

Input B bus 242 supplies data to the B-port of arithmetic logic unit 230. Barrel rotator 235 supplies data to input B bus 242. Thus barrel rotator 235 controls the input to the B-port of arithmetic logic unit 230. Barrel rotator 235 receives data from arithmetic logic unit second input bus 206. Arithmetic logic unit second input bus 206 supplies data from a specified one of data registers 200, data from global port source data bus Gsrc bus 105 via buffer 104 or a special data word from buffer 236. Buffer 236 supplies a 32 bit data constant of "00000000000000000000000000000001" (also called Hex "1") to arithmetic logic unit second input bus 206 if enabled. Note hereinafter data or addresses preceded by "Hex" are expressed in hexadecimal. Data from global port source data bus Gsrc 105 may be supplied to barrel rotator 235 as a long distance source as previously described. When buffer 236 is enabled, barrel rotator 235 enables generation on input B bus 242 of any constant of the form $2^N$, where N is the barrel rotate amount. Constants of this form are useful in operations to control only a single bit of a 32 bit data word. The data supplied to arithmetic logic unit second input bus 206 and barrel rotator 235 depends upon the instruction.

Barrel rotator 235 is a 32 bit rotator that may rotate its received data from 0 to 31 positions. It is a left rotator, however, a right rotate of n bits may be obtained by left rotating 32-n bits. A five bit input from rotate bus 244 controls the amount of rotation provided by barrel rotator 235. Note that the rotation is circular and no bits are lost. Bits rotated out the left of barrel rotator 235 wrap back into the right. Multiplexer Smux 231 supplies rotate bus 244. Multiplexer Smux 231 has several inputs. These inputs include: the five least significant bits of multiplier first input bus 201; the five least significant bits of multiplier second input bus 202; five bits from the "DBR" field of data register D0; and a five bit zero constant "00000". Note that because multiplier second input bus 202 may receive immediate data via multiplexer Imux 222 and buffer 223, the instruction word can supply an immediate rotate amount to barrel rotator 235. Multiplexer Smux 231 selects one of these inputs to determine the amount of rotation in barrel rotator 235 depending on the instruction. Each of these rotate quantities is five bits and thus can set a left rotate in the range from 0 to 31 bits.

Barrel rotator 235 also supplies data to multiplexer Bmux 227. This permits the rotated data from barrel rotator 235 to be stored in one of the data registers 200 via multiplier destination bus 203 in parallel with an operation of arithmetic logic unit 230. Barrel rotator 235 shares multiplier destination bus 203 with multiplexer Rmux 221 via multiplexer Bmux 227. Thus the rotated data cannot be saved if a multiply operation takes place. In the preferred embodiment this write back method is particularly supported by extended arithmetic logic unit operations, and can be disabled by specifying the same register destination for barrel rotator 235 result as for arithmetic logic unit 230 result. In this case only the result of arithmetic logic unit 230 appearing on arithmetic logic unit destination bus 204 is saved.

Although the above description refers to barrel rotator 235, those skilled in the art would realize that substantial utility can be achieved using a shifter which does not wrap around data. Particularly for shift and mask operations where not all of the bits to the B-port of arithmetic logic unit 230 are used, a shifter controlled by rotate bus 244 provides the needed functionality. In this event an additional bit, such as the most significant bit on the rotate bus 244, preferably indicates whether to form a right shift or a left shift. Five bits on rotate bus 244 are still required to designate the magnitude of the shift. Therefore it should be understood in the description below that a shifter may be substituted for barrel rotator 235 in many instances.

Input C bus 243 supplies data to the C-port of arithmetic logic unit 230. Multiplexer Cmux 233 supplies data to input C bus 243. Multiplexer Cmux 233 receives data from four sources. These are LMO/RMO/LMBC/RMBC circuit 237, expand circuit 238, multiplier second input bus 202 and mask generator 239.

LMO/RMO/LMBC/RMBC circuit 237 is a dedicated hardware circuit that determines either the left most "1", the right most "1", the left most bit change or the right most bit change of the data on arithmetic logic unit second input bus 206 depending on the instruction or the "FMOD" field of data register D0. LMO/RMO/LMBC/RMBC circuit 237 supplies to multiplexer Cmux 233 a 32 bit number having a value corresponding to the detected quantity. The left most bit change is defined as the position of the left most bit that is different from the sign bit 32. The right most bit change is defined as the position of the right most bit that is different from bit 0. The resultant is a binary number corresponding to the detected bit position as listed below in Table 2. The values are effectively the big endian bit number of the detected bit position, where the result is 31-(bit position).

TABLE 2

| bit position | result |
| --- | --- |
| 0 | 31 |
| 1 | 30 |
| 2 | 29 |
| 3 | 28 |
| 4 | 27 |
| 5 | 26 |
| 6 | 25 |
| 7 | 24 |
| 8 | 23 |
| 9 | 22 |
| 10 | 21 |
| 11 | 20 |
| 12 | 19 |
| 13 | 18 |
| 14 | 17 |
| 15 | 16 |
| 16 | 15 |
| 17 | 14 |
| 18 | 13 |
| 19 | 12 |
| 20 | 11 |
| 21 | 10 |
| 22 | 9 |
| 23 | 8 |
| 24 | 7 |
| 25 | 6 |
| 26 | 5 |
| 27 | 4 |
| 28 | 3 |
| 29 | 2 |
| 30 | 1 |
| 31 | 0 |

This determination is useful for normalization and for image compression to find a left most or right most "1" or changed bit as an edge of an image. The LMO/RMO/LMBC/RMBC circuit 237 is a potential speed path, therefore the source coupled to arithmetic logic unit second input bus 206 is preferably limited to one of the data registers 200. For the left most "1" and the right most "1" operations, the "V" bit indicating overflow of status register 210 is set to "1" if there were no "1's" in the source, and "0" if there were. For the left most bit change and the right most bit change operations, the "V" bit is set to "1" if all bits in the source were equal, and "0" if a change was detected. If the "V" bit is set to "1" by any of these operations, the LMO/RMO/LMBC/RMBC result is effectively 32. Further details regarding the operation of status register 210 appear above.

Expand circuit 238 receives inputs from multiple flags register 211 and status register 210. Based upon the "Msize" field of status register 210 described above, expand circuit 238 duplicates some of the least significant bits stored in multiple flags register 211 to fill 32 bits. Expand circuit 238 may expand the least significant bit 32 times, expand the two least significant bits 16 times or expand the four least significant bits 8 times. The "Asize" field of status register 210 controls processes in which the 32 bit arithmetic logic unit 230 is split into independent sections for independent data operations. This is useful for operation on pixels sizes less than the 32 bit width of arithmetic logic unit 230. This process, as well as examples of its use, will be further described below.

Mask generator 239 generates 32 bit masks that may be supplied to the input C bus 243 via multiplexer Cmux 233. The mask generated depends on a 5 bit input from multiplexer Mmux 234. Multiplexer Mmux 234 selects either the 5 least significant bits of multiplier second input bus 202, or the "DBR" field from data register D0. In the preferred embodiment, an input of value N causes mask generator 239 to generate a mask generated that has N "1's" in the least significant bits, and 32-N "0's" in the most significant bits. This forms an output having N right justified "1's". This is only one of four possible methods of operation of mask generator 239. In a second embodiment, mask generator 239 generates the mask having N right justified "0's", that is N "0's" in the least significant bits and N-32 "1's" in the most significant bits. It is equally feasible for mask generator 239 to generate the mask having N left justified "1's" or N left justified "0's". Table 3 illustrates the operation of mask generator 239 in accordance with the preferred embodiment when multiple arithmetic is not selected.

TABLE 3

| Mask Generator Input | Mask - Nonmultiple Operation |
| --- | --- |
| 0 0 0 0 0 | 0000 0000 0000 0000 0000 0000 0000 0000 |
| 0 0 0 0 1 | 0000 0000 0000 0000 0000 0000 0000 0001 |
| 0 0 0 1 0 | 0000 0000 0000 0000 0000 0000 0000 0011 |
| 0 0 0 1 1 | 0000 0000 0000 0000 0000 0000 0000 0111 |
| 0 0 1 0 0 | 0000 0000 0000 0000 0000 0000 0000 1111 |
| 0 0 1 0 1 | 0000 0000 0000 0000 0000 0000 0001 1111 |
| 0 0 1 1 0 | 0000 0000 0000 0000 0000 0000 0011 1111 |
| 0 0 1 1 1 | 0000 0000 0000 0000 0000 0000 0111 1111 |
| 0 1 0 0 0 | 0000 0000 0000 0000 0000 0000 1111 1111 |
| 0 1 0 0 1 | 0000 0000 0000 0000 0000 0001 1111 1111 |
| 0 1 0 1 0 | 0000 0000 0000 0000 0000 0011 1111 1111 |
| 0 1 0 1 1 | 0000 0000 0000 0000 0000 0111 1111 1111 |
| 0 1 1 0 0 | 0000 0000 0000 0000 0000 1111 1111 1111 |
| 0 1 1 0 1 | 0000 0000 0000 0000 0001 1111 1111 1111 |
| 0 1 1 1 0 | 0000 0000 0000 0000 0011 1111 1111 1111 |
| 0 1 1 1 1 | 0000 0000 0000 0000 0111 1111 1111 1111 |
| 1 0 0 0 0 | 0000 0000 0000 0000 1111 1111 1111 1111 |
| 1 0 0 0 1 | 0000 0000 0000 0001 1111 1111 1111 1111 |
| 1 0 0 1 0 | 0000 0000 0000 0011 1111 1111 1111 1111 |
| 1 0 0 1 1 | 0000 0000 0000 0111 1111 1111 1111 1111 |
| 1 0 1 0 0 | 0000 0000 0000 1111 1111 1111 1111 1111 |
| 1 0 1 0 1 | 0000 0000 0001 1111 1111 1111 1111 1111 |
| 1 0 1 1 0 | 0000 0000 0011 1111 1111 1111 1111 1111 |
| 1 0 1 1 1 | 0000 0000 0111 1111 1111 1111 1111 1111 |
| 1 1 0 0 0 | 0000 0000 1111 1111 1111 1111 1111 1111 |
| 1 1 0 0 1 | 0000 0001 1111 1111 1111 1111 1111 1111 |
| 1 1 0 1 0 | 0000 0011 1111 1111 1111 1111 1111 1111 |
| 1 1 0 1 1 | 0000 0111 1111 1111 1111 1111 1111 1111 |
| 1 1 1 0 0 | 0000 1111 1111 1111 1111 1111 1111 1111 |
| 1 1 1 0 1 | 0001 1111 1111 1111 1111 1111 1111 1111 |
| 1 1 1 1 0 | 0011 1111 1111 1111 1111 1111 1111 1111 |
| 1 1 1 1 1 | 0111 1111 1111 1111 1111 1111 1111 1111 |

A value N of "0" thus generates 32 "0's". In some situations however it is preferable that a value of "0" generates 32 "1's". This function is selected by the "%!" modification specified in the "FMOD" field of status register 210 or in bits 52, 54, 56 and 58 of the instruction when executing an extended arithmetic logic unit operation. This function can be implemented by changing the mask generated by mask generator 239 or by modifying the function of arithmetic logic unit 230 so that mask of all "0's" supplied to the C-port operates as if all "1's" were supplied. Note that similar modifications of the other feasible mask functions are possible. Thus the "%!" modification can change a mask generator 239 which generates a mask having N right justified "0's" to all "0's" for N=0. Similarly, the "%!" modification can change a mask generator 239 which generates N left justified "1's" to all "1's" for N=0, or change a mask generator 239 which generates N left justified "0's" to all "0's" for N=0.

Selection of multiple arithmetic modifies the operation of mask generator 239. When the "Asize" field of status register is "110", this selects a data size of 32 bits and the operation of mask generator 239 is unchanged from that shown in Table 3. When the "Asize" field of status register is "101", this selects a data size of 16 bits and mask generator 239 forms two independent 16 bit masks. This is shown in Table 4. Note that in this case the most significant bit of the input to mask generator 239 is ignored. Table 4 shows this bit as a don't care "X".

TABLE 4

| Mask Generator Input | Mask - Half Word Operation | | | | | | | |
|---|---|---|---|---|---|---|---|---|
| X 0 0 0 0 | 0000 | 0000 | 0000 | 0000 | 0000 | 0000 | 0000 | 0000 |
| X 0 0 0 1 | 0000 | 0000 | 0000 | 0001 | 0000 | 0000 | 0000 | 0001 |
| X 0 0 1 0 | 0000 | 0000 | 0000 | 0011 | 0000 | 0000 | 0000 | 0011 |
| X 0 0 1 1 | 0000 | 0000 | 0000 | 0111 | 0000 | 0000 | 0000 | 0111 |
| X 0 1 0 0 | 0000 | 0000 | 0000 | 1111 | 0000 | 0000 | 0000 | 1111 |
| X 0 1 0 1 | 0000 | 0000 | 0001 | 1111 | 0000 | 0000 | 0001 | 1111 |
| X 0 1 1 0 | 0000 | 0000 | 0011 | 1111 | 0000 | 0000 | 0011 | 1111 |
| X 0 1 1 1 | 0000 | 0000 | 0111 | 1111 | 0000 | 0000 | 0111 | 1111 |
| X 1 0 0 0 | 0000 | 0000 | 1111 | 1111 | 0000 | 0000 | 1111 | 1111 |
| X 1 0 0 1 | 0000 | 0001 | 1111 | 1111 | 0000 | 0001 | 1111 | 1111 |
| X 1 0 1 0 | 0000 | 0011 | 1111 | 1111 | 0000 | 0011 | 1111 | 1111 |
| X 1 0 1 1 | 0000 | 0111 | 1111 | 1111 | 0000 | 0111 | 1111 | 1111 |
| X 1 1 0 0 | 0000 | 1111 | 1111 | 1111 | 0000 | 1111 | 1111 | 1111 |
| X 1 1 0 1 | 0001 | 1111 | 1111 | 1111 | 0001 | 1111 | 1111 | 1111 |
| X 1 1 1 0 | 0011 | 1111 | 1111 | 1111 | 0011 | 1111 | 1111 | 1111 |
| X 1 1 1 1 | 0111 | 1111 | 1111 | 1111 | 0111 | 1111 | 1111 | 1111 |

The function of mask generator 239 is similarly modified for a selection of byte data via an "Asize" field of "100". Mask generator 239 forms four independent masks using only the three least significant bits of its input. This is shown in Table 5.

TABLE 5

| Mask Generator Input | Mask - Byte Operation | | | | | | | |
|---|---|---|---|---|---|---|---|---|
| X X 0 0 0 | 0000 | 0000 | 0000 | 0000 | 0000 | 0000 | 0000 | 0000 |
| X X 0 0 1 | 0000 | 0001 | 0000 | 0001 | 0000 | 0001 | 0000 | 0001 |
| X X 0 1 0 | 0000 | 0011 | 0000 | 0011 | 0000 | 0011 | 0000 | 0011 |
| X X 0 1 1 | 0000 | 0111 | 0000 | 0111 | 0000 | 0111 | 0000 | 0111 |
| X X 1 0 0 | 0000 | 1111 | 0000 | 1111 | 0000 | 1111 | 0000 | 1111 |
| X X 1 0 1 | 0001 | 1111 | 0001 | 1111 | 0001 | 1111 | 0001 | 1111 |
| X X 1 1 0 | 0011 | 1111 | 0011 | 1111 | 0011 | 1111 | 0011 | 1111 |
| X X 1 1 1 | 0111 | 1111 | 0111 | 1111 | 0111 | 1111 | 0111 | 1111 |

As noted above, it is feasible to support multiple operations of 8 sections of 4 bits each, 16 sections of 2 bits each and 32 single bit sections. Those skilled in the art would realize that these other data sizes require similar modification to the operation of mask generator 239 as shown above in Tables 3, 4 and 5.

Arithmetic logic unit 230 supplies a resultant to arithmetic logic unit destination bus 204. This resultant may be stored in one of the data registers of data registers 200. Alternatively the resultant may be stored in another register within digital image/graphics processor 71 via buffer 108 and global port destination data bus Gdst 107. This function is called a long distance operation. The instruction specifies the destination of the resultant. Function signals supplied to arithmetic logic unit 230 from function signal generator 245 determine the particular three input function executed by arithmetic logic unit 230 for a particular cycle. Bit 0 carry-in generator 246 forms a carry-in signal supplied to bit 0, the first bit of arithmetic logic unit 230. As previously described, during multiple arithmetic operations bit 0 carry-in generator 246 supplies the carry-in signal to the least significant bit of each of the multiple sections.

Figure 8:
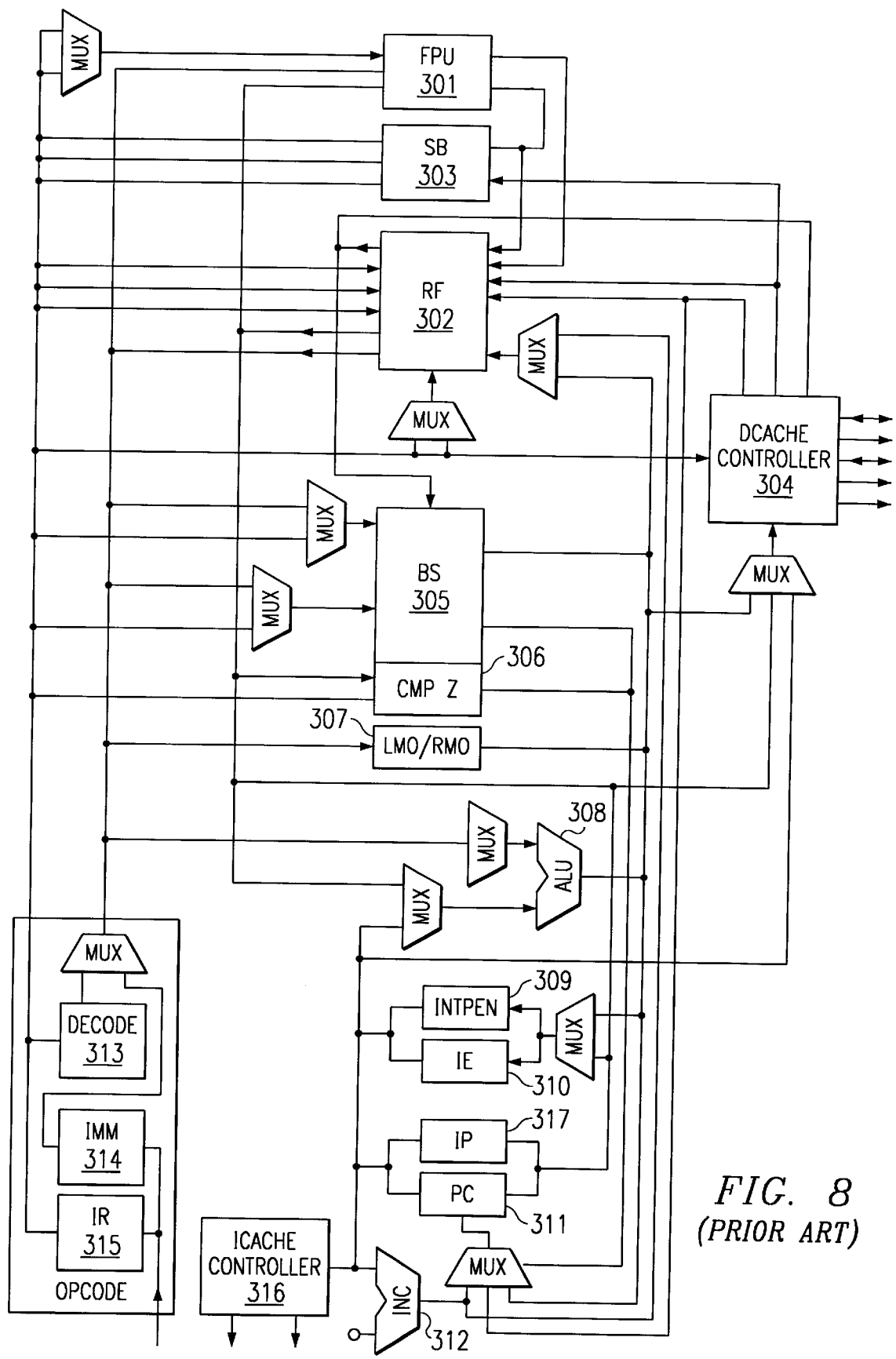
FIG. 8 illustrates the architecture of the prior art master processor employed in the preferred embodiment of this invention.

FIG. 8 shows a simplified diagram of master processor 60. Major blocks of master processor 60 are: a floating point unit (FPU) 301; a register file (RF) 302; a register scoreboard (SB) 303 that ensures results of floating point operations and memory loads are available before they are used as sources and arbitrates between data cache and floating point unit 301 for access to their shared write port to register file 302; a data cache controller 304 which also handles the interface to the on-chip memory via the crossbar and to external memory via transfer processor 80; a barrel shifter (BS) 305 that performs shift instructions; compare to zero logic 306; left most one/right most one detection logic (LMO/RMO) 307; integer arithmetic logic unit (ALU) 308 used for add, subtract and logical operations and to compute branch target address during relative branches; interrupt pending register (INTPEN) 309 that receives master processor interrupt signals; interrupt enable register (IE) 310 that selectively enables or disables interrupts; program counter register (PC) 311 holds the address of the instruction to be fetched; program counter incrementer (INC) 312 that increments program counter 311 to point to the next instruction, with the incremented value can also be routed to the register file as a "return" or "link" address; instruction decode logic (DECODE) 313 that decodes instruction and supplies control signals to the operating units; instruction register (IR) 314 that holds the address of the instruction being executed; immediate register (IMM) 315 that stores any instruction immediate data; and the instruction cache controller (ICACHE) 316, that provides instructions to be executed, interfaces to transfer processor 80 for cache fills.

FIG. 9 shows the basic pipeline used in master processor 60. Master processor 60 has a three stage pipeline including fetch, execute and memory stages. FIG. 9 shows how three instructions through the pipeline. During the fetch stage of the pipeline program counter 311 is used to address the instruction cache and read a 32 bit instruction. During the execute stage the instruction is decoded, the source operands read from the register file, the operation performed, and a result written back to the register file. The memory stage is only present for load and store operations. The address calculated during the execute stage is used to address the data cache and the data are read or written. If a miss occurs on the instruction cache, the fetch and execute pipelines are stalled until the request can be serviced. If a miss occurs on the data cache, the memory pipeline stalls, but the fetch and execute pipelines continue to flow, until another memory operation needs to be initiated.

FIG. 10 shows the basic pipeline for floating point unit 301. The fetch stage is the same as the fetch stage of integer operations previously described. During the unpack stage of a floating point instruction, all data necessary to begin the floating point operation arrives including source operands, opcode, precision and destination address. The two source operands are read from the register file. Operands are then unpacked into sign, exponent, mantissa fields and the detection of special cases takes place. Input exceptions are detected in this cycle. And input exceptions will be piped through floating point unit 301 and will be signaled on the same cycle as a single precision output exception. The other special cases involving signaling not-a-number, quiet not-a-number, infinity, denormal, and zero, are also detected and this information, which is not visible to user, will follow the data through the different pipeline stages of floating point unit 301.

All computation takes place during the operate stage. Depending on the type of instruction, several cycles in the operate stage may be required.

Output exceptions are detected in the final normalize stage. When floating point unit 301 result is determined, some of the individual information about this floating point operation is recorded in a floating point status register. Any floating point instruction writes to the floating point status register once and only once.

This invention approximates the Bezier curve as a sequence of line segments. The Bezier curve equation is separated into 2 parametric equations, one for X(t) and one for Y(t). For a third order Bezier curve, each of these equations is a third degree polynomial in t whose value ranges from 0.0 to 1.0. Equation (2) above can be expressed as:

$$P(u)=P_0(1-3u+3u^2-u^3)+3P_1(u-2u^2+3u^3)+3P_2(u^2-u^3)+P_3u^3 \quad (3)$$

where: $P_i$ is the coordinates $(X_i, Y_i)$. Grouping these terms in powers of u yields:

$$P(u)=P_0+3(P_1-P_0)u+3(P_2-2P_1+P_0)u^2+(P_3-3P_2+3P_1-P_0)u^3 \quad (4)$$

For ease of computation we can transform the coordinates so that the first control point $P_0$ falls on the origin (0,0). This transformation changes $P_0$ to (0,0) and each $P_i$ for $i \neq 0$ to $V_i$. Making this substitution, equation (4) becomes:

$$Q(u)=3V_1u+3(V_2-2V_1)u^2+(V_3-3V_2+3V_1)u^3 \quad (5)$$

Thus the separate equations for X(t) and Y(t) can be expressed in the form:

$$X(t)=t(a_x+t(b_x+tc_x)) \quad (6)$$

$$Y(t)=t(a_y+t(b_y+tc_y)) \quad (7)$$

Two methods can be used to evaluate the parametric equations (6) and (7). Both methods use fixed point integer arithmetic to directly calculate values of the X(t) and Y(t) equations from equations (6) and (7), which are the coordinates of the points along the curve. The first gives a predictable execution time and uses line segments to connect the points as a piecewise straight line approximation to the curve. The second allows Y(t), the scan line variable, to change only in predetermined integer steps. The value of X(t) is evaluated for the t corresponding to the integer step in Y(t). Since X(t) can be multi-valued for each scan line, it is necessary to guarantee that the scan line is closed at the inflection points of the Bezier curve. The second method gives a new X value for each scan line. This has a natural advantage, if a closed path is being decomposed as a run array rather than a collection of trapezoids. Both methods create the lines segments in natural order. This is advantageous for polygon fill algorithms because it eliminates the need for edge sorting.

The first method of direction calculation of X(t) and Y(t) from equations (6) and (7) employs equal steps of the parametric variable t. Assume the number of such steps in t is N. Equations (6) and (7) can be evaluated in steps of 1/N. Equations (6) and (7) can then be evaluated in the following pseudocode loop:

$$L=|\Delta x|+|\Delta y|+\tfrac{1}{2}Min[|\Delta x|,|\Delta y|]$$

FOR
   i=1 to N
   t=i/N
   X=t($a_x$+t($b_x$+t$c_x$))
   Y=t($a_y$+t($b_y$+t$c_y$))
END

The division employed in the first step in the loop requires a floating point computation for the necessary accuracy. These computations can be performed on an integer digital signal processor such as digital image/graphics processors 71, 72, 73 and 74 by suitable scaling. It is expected that 256 intervals in t would always be sufficient. Accordingly, the equations are scaled by 256, which can be performed by a shift operation via barrel rotator 235. This changes the processor operations to the following pseudocode:

t=0

$\Delta t$=256/N

FOR
   i=1 to N
   t=t+$\Delta t$
   X=(t$c_x$)>>8
   X=(t(bx+X))>>8
   X=(t$a_x$+X)>>8
   Y=(t$c_y$)>>8
   Y=t($b_y$+Y)>>8
   Y=(t$a_y$+Y)>>8
END where: the symbol ">>" indicates a right shift or binary division by the number of bits indicated, in this case 8 bits. The grouping of the terms in equations (6) and (7) facilitates this computation of the X and Y values by regularizing the shift/divisions.

For best results the number of steps N is set as a even power of 2. This enables exact computation of the value of $\Delta t$. This exact value of $\Delta t$ used in the computations serves to increase the accuracy of the curve point coordinates beyond what would normally be expected based upon the selected word length.

This process can be speeded further using some additional capacities of the digital image/graphics processors 71 to 74. As noted above, each of these processors may simultaneously form a 16 bit by 16 bit product and an arithmetic operation. If 16 bit quantities provide sufficient accuracy, then the processor may overlap 16 bit by 16 bit multiplies in multiplier 220 with a pair of 16 bit adds in arithmetic logic unit 230. If 8 bit quantities provide sufficient accuracy, multiplier 220 can perform a pair of 8 bit by 8 bit multiplies at the same time arithmetic logic unit 230 performs four 8 bit additions. Thus the process may be speeded considerably.

The step size in t is the reciprocal of the number of iteration steps. The number of iteration steps may be chosen based on the sum of the lengths of the line segments connecting the 4 controlling points defining the Bezier curve. These segments are: $V_0$ to $V_1$; $V_1$ to $V_2$; $V_2$ to $V_3$; and $V_3$ to $V_4$. Because these points form a bounding box for the Bezier curve, the sum of these line segments will always exceed the actual curve length. The number of iteration steps is then the next power of two greater than this sum. Let the unit of measure be the distance between adjacent pixels. Rather than employing the square root function, the distance between two points can be estimated using the formula:

$$L=|\Delta x|+|\Delta y|+\tfrac{1}{2}Min[|\Delta x|+|\Delta y|]$$

The sum of these L's provides the estimate of the curve length. The number of calculated points will typically be in the range of every four pixel spaces. Thus the number of steps can be estimated from L>>2. Each digital image/graphics processor includes a left most one function. Thus the number of steps can be computed as:

$$sc=31-LMO(L>>2)$$

steps=1<<sc

The number of fractional bits used in the fixed point math represented by N need not be limited to the 8 bits used above. This number N may be selected based on the size of the curve being converted.

This first method which gives a predictable execution time. This first method is constrained in accuracy due to the word length of the split arithmetic logic unit and split multiplier used in the computation. It uses a uniform step in the parametric variable which causes nonuniform steps in both Y(t) and X(t).

The second method changes t so that changes in Y(t), the scan line variable, are predetermined. The step size is 1 scan line; that is, Y(t+Δt)=Y(t)+1. The value of t is determined that results in the integer part of the new value equal to the old scan line value plus 1. This value of t is then used to evaluate X(t) and the integer part is used to define the pixel within the scan line intersected by the curve. The first t that is computed becomes the initial Δt because the method always increments from t=0.0 to t=1.0. The next value of t is set equal to the prior value of t plus Δt. If Y(t) changes more than the predetermined step size of one scan line, the Δt is reduced until the change in Y(t) is correct. This reduction preferable uses a binary search method. In like manner if the change in Y(t) is too small, then Δt is increased. When Y(t) is changing nearly linearly with t, we evaluate X(t) often but if Y(t) has reached an asymptote then X(t) will be evaluated less often. With the scan line step size set to 1, this algorithm will give the exact (x,y) pairs on the page that are intersected by the Bezier curve.

This binary search algorithm operates as follows. Given the parametric equation for Y (equation (7) above), we desire to change t to create a unit change in Y. Because of the translation of the first control point to the origin (0,0), a t of 0 yields a Y and an X of 0. To determine the next value of t, we can arbitrarily set Δt equal to ¹⁄₂₅₆. This number is easy to form in the data processors using right shifts. Using equation (7) and the new value of t=t+Δt, we calculate the new value of Y. If this new value of Y exceeds the prior value of Y by more than a small error factor ϵ, then the Δt step in t is too great. Next we divide Δt by 2, again using a right shift operation. Another new value of Y is computed and compared with the previous old value of Y. If on the other hand, the initial newly calculate value of Y is less than 1−ϵ, then Δt is increased by half its value. Thus Δt is set to Δt+(Δt/2). This search continues until a value of Δt is found that satisfies the inequality:

$$1-\epsilon<Y(t)-Y(t+\Delta t)<1+\epsilon \quad (8)$$

Once a value of Δt is found that satisfied this inequality, the corresponding X coordinate X(t+Δt) is computed from equation (6). This provides the next point on the Bezier curve to be plotted. The process of searching for a new Δt for the next scan line repeats until t reaches 1.0 and the Bezier curve is completely plotted.

A manner of performing this process is shown in the following pseudocode sequence:

```
/*Initialize coordinates x0, y0, x1, y1, x2, y2, x3 and
y3 of the 4 control points. Note x0=0 and y0=0 due
to translation of origin*/
/*Compute constants for X and Y computation*/
ax=3*x1
ay=3*y1
bx=3*(x2-2*x1)
by=3*(y2-2*y1)
/*Next step search initialization*/
t=0
tt=0
Y(1)=0
X(1)=0
while t<1
    y_compare=0
    Δt=¹⁄₂₅₆
    while (y_compare>1.1 AND y_compare<0.9
        if y_compare<1
            Δt=Δt*2
            t=t+Δt
        if y_compare>1
            Δt=Δt/2
            t=t-Δt
    end
    Y(tt+1)=FIX(t*(ay+t*(by+t*cy)))
    y_compare=ABS(Y(tt+1)-Y(tt))
end
tt=tt+1
X(tt)=FIX(t*(ax+t*(bx+t*cx)))
end
Plot(X,Y)
```

Note that: the ABS function forms the absolute value of its argument; and the last statement Plot(X,Y) renders the calculated point into the printer or display buffer.

There remains another problem with this second method. As the parametric variable t varies from 0.0 to 1.0, the scan line variable Y(t) generally varies nonuniformly. Additionally, the scan line variable Y(t) may also vary nonmonotonically. An increase in the parametric variable t may cause Y to initially increase, reach an inflection point and then decrease. An example of this is illustrated in FIG. 11. In FIG. 11, Y in increasing (down the page) for increasing t in region 410. The value of Y decreases and goes up the page for increasing t in region 420. In region 430 the value of Y changes very little with changes in t.

There are three regions of the curve to be considered. These three regions are where the slope is negative, the slope is positive and the slope is near zero. In the first region having a negative slope, a change from t to t+Δt yields a decrease in Y(t). In this region ΔY, which is Y(t)−Y(t+Δt), is less than zero. If ΔY is less than −(1+ϵ) or greater than −(1−ϵ), then Δt should be adjusted to get ΔY nearer to −1. When the equality −(1+ϵ)<ΔY<−(1−ϵ) is satisfied, then Y and X for the corresponding t are plotted. This is similar to the binary search described above. The second region, where ΔY is greater than zero corresponds to the description above.

The greatest difficulty occurs where ΔY is near zero. This corresponds to an inflection point in the Bezier curve to be plotted. This invention approximates the second derivative of the curve in this region by comparing the sign of the old ΔY to the sign of the new ΔY. The binary search method used in the other regions may not close upon a point to be plotted and may diverge. If this case is discovered, one solution is to set the current Y for the next (X,Y) point to the prior Y. This would close the line segment to be drawn, but may not be completely accurate. Another manner to handle inflection points is to reverse the direction of plotting from increasing t from 0.0 to decreasing t from 1.0. This will generally result in the most accurate closed curve.

A manner of performing this process is shown in the following pseudocode sequence:

```
/*Initialize coordinates x0, y0, x1, y1, x2, y2, x3 and
  y3 of the 4 control points. Note x0=0 and y0=0 due
  to translation of origin*/
/*Compute constants for X and Y computation*/
ax=3*x1
ay=3*y1
bx=3*(x2-2*x1)
by=3*(y2-2*y1)
  /*Next step search initialization*/
y_step=1
tt=0
Y(1)=0
X(1)=0
Δt=1/256
t=Δt
Δt_sign=1
y_temp=FIX(t*(ay+t*(by+t*cy)))
while (ABS(y_temp)≠y_step)
    if ABS(y_temp)<y_step
        Δt=Δt*2
        Δt_sign=1
    else
        Δt=Δt/2
        Δt_sign=-1
    end
    t=t+Δt_sign*Δt
    y_temp=FIX(t*(ay+t*(by+t*cy)))
end
tt=tt+1
Y(tt)=y_temp
X(tt)=FIX(t*(ax+t*(bx+t*cx)))
while t<1
    y_compare=ABS(Y(tt)-Y(tt-1))
        if y_comp<y_step
            Δt=Δt*2
            Δt_sign=1
        else
            Δt=Δt/2
            Δt_sign=-1
        end
        t=t+Δt_sign*Δt
        y_temp=FIX(t*(ay+t*(by+t*cy)))
        y_compare=ABS(y_temp-Y(tt))
    end
    tt=tt+1
    Y(tt)=y_temp
    X(tt)=FIX(t*(ax+t*(bx+t*cx)))
    if (sign(Y(tt))-Y(tt-1))≠sign(Y(tt-1)-Y(tt-2))
        Y(tt)=Y(tt-1)
        tt=tt+1
        Y(tt)=y_temp
        X(tt)=X(tt-1)
    end
end
Plot(X,Y)
```

Note that the final if statement tests for a change in the second derivative of Y, indicating an inflection point. The use of Δt_sign causes the process to increment in t or decrement in t as appropriate.

In general the second method requires higher precision than the first method described above. This second method generally requires 16 bit fractions whereas the first method may provide sufficient accuracy with 8 or less bit fractions. In this second method, directly plots scan line steps in Y. This has the result of providing a set of line segments which are easier to employ in further polygon or trapezoid processing.

What is claimed is:

1. A computer implemented method of converting a curve expressed as a Bezier curve into a corresponding set of line segments comprising the steps of:

expressing the Bezier curve in a pair of parametric equations in horizontal and vertical coordinates in a parametric variable;

selecting a plurality of points at equally spaced intervals of said parametric variable having a number in proportion to an estimated length of the Bezier curve, the selected plurality being an integral power of 2, the step of selecting a number of the plurality of computed points including dividing the estimated length of the Bezier curve expressed in terms of an adjacent pixel distance by a predetermined factor, and selecting the number of computed points as a next larger integral power of 2 than the estimated length of the Bezier curve;

computing respective horizontal and vertical coordinates of said selected plurality of points; and forming line segments between respective adjacent computed points.

2. The computer implemented method of claim 1, wherein:

the predetermined factor is 4;

the step of dividing the estimated length by the predetermined factor includes right shifting a binary expression of the length by 2 bit positions;

the step of selecting the number of computed points includes right shifting a binary data word having a least significant 1 and other bits equal to zero by a quantity equal to a number of bits in the binary data word minus the number of bit positions to the left most 1 bit in the quotient of the dividing step.

3. A printer comprising:

a transceiver adapted for bidirectional communication with a communications channel;

a memory;

a print engine adapted for placing color dots on a printed page according to received image data and control signals; and a programmable data processor connected to said transceiver, said memory and said print engine, said programmable data processor programmed to receive print data corresponding to pages to be printed from the communications channel via said transceiver;

convert said print data into image data and control signals for supply to said print engine for printing a corresponding page, said conversion including converting a curve expressed as a Bezier curve into a corresponding set of line segments by:
  expressing the Bezier curve in a pair of parametric equations in horizontal and vertical coordinates in a parametric variable,
  selecting a plurality of points at equally spaced intervals of said parametric variable having a number in proportion to an estimated length of the Bezier curve, the selected plurality being an integral power of 2, said selecting performed by
    dividing the estimated length of the Bezier curve expressed in terms of an adjacent pixel distance by a predetermined factor, and
    selecting the number of computed points as a next larger integral power of 2 than the estimated length of the Bezier curve,
  computing respective horizontal and vertical coordinates of said selected plurality of points,
  forming line segments between respective adjacent computed points; and
  controlling said print engine according to said image data and control signals to print a corresponding page.

4. The printer of claim 3, wherein:
said data processor includes a shifter and a left most one detector detecting the bit position of the most significant 1 bit in an input data word and is further programmed to
  set a predetermined factor of 4,
  divide the estimate the length by the predetermined factor by right shifting via said shifter a binary expression of the length by 2 bit positions;
  detect a bit position of the left most one in the result of the division;
  subtract a number corresponding to the detected bit position from one less than a number of bits in a data word; and
  determine the by right shifting a binary data word having a least significant 1 and other bits equal to zero by the result of the subtraction.

5. The computer implemented method of converting a curve expressed as a Bezier curve into a corresponding set of line segments comprising the steps of:
  expressing the Bezier curve in a pair of parametric equations in horizontal and vertical coordinates in a parametric variable;
  computing respective horizontal and vertical coordinates of a plurality of points at intervals of the parametric variable selected to provide integral steps in the vertical coordinate, including for each computed horizontal and vertical coordinate
    adding a selected interval of the parametric variable to a prior value of the parametric variable to obtain a new value of the parametric variable,
    computing the vertical coordinate employing the new value of the parametric variable,
    comparing the change in the vertical coordinate from the prior value of the parametric variable to the new value of the parametric variable with a desired integral interval in vertical coordinates,
    adjusting the interval of the parametric variable dependent upon said comparison and repeating said steps of adding, computing and comparing until the computed vertical coordinate is within a predetermined range of the desired integral interval, and
    computing the horizontal coordinate employing the value of the parametric variable placing the computed vertical coordinate within the predetermined range of the desired integral interval; and
  forming line segments between respective adjacent computed points.

6. The computer implemented method of claim 5, wherein:
said step of adjusting the interval of the parametric variable dependent upon said comparison includes doubling the selected interval of the parametric variable upon detection of one direction of error in the computed vertical coordinate and halving selected interval of the parametric variable upon detection of an opposite direction of error in the computed vertical coordinate.

7. The computer implemented method of converting a curve expressed as a Bezier curve into a corresponding set of line segments comprising the steps of:
  expressing the Bezier curve in a pair of parametric equations in horizontal and vertical coordinates in a parametric variable;
  computing respective horizontal and vertical coordinates of a plurality of points at intervals of the parametric variable selected to provide integral steps in the vertical coordinate;
  testing adjacent computed vertical coordinates to detect an inflection point in the Bezier curve;
  said step of computing respective horizontal and vertical coordinates of the plurality of points initially advances said parametric variable from 0.0 toward 1.0 unless and until an inflection point is detected, and thereafter computing respective horizontal and vertical coordinates of the plurality of points advancing said parametric variable from 1.0 toward 0.0; and
  forming line segments between respective adjacent computed points.

8. A printer comprising:
a transceiver adapted for bidirectional communication with a communications channel;
a memory;
a print engine adapted for placing color dots on a printed page according to received image data and control signals; and
a programmable data processor connected to said transceiver, said memory and said print engine, said programmable data processor programmed to
  receive print data corresponding to pages to be printed from the communications channel via said transceiver;
  convert said print data into image data and control signals for supply to said print engine for printing a corresponding page, said conversion including converting a curve expressed as a Bezier curve into a corresponding set of line segments by:
    expressing the Bezier curve in a pair of parametric equations in horizontal and vertical coordinates in a parametric variable,
    computing respective horizontal and vertical coordinates of a plurality of points at intervals of the parametric variable selected to provide integral steps in the vertical coordinate including for each computed horizontal and vertical coordinate by adding a selected interval of the parametric variable to a prior value of the parametric variable to obtain a new value of the parametric variable, computing the vertical coordinate employing the new value of the parametric variable, comparing the change in the vertical coordinate from the prior value of the parametric variable to the new value of the parametric variable with a desired integral interval in vertical coordinates, adjusting the interval of the parametric variable dependent upon said comparison and repeating said steps of adding, computing and comparing until the computed vertical coordinate is within a predetermined range of the desired integral interval, computing the horizontal coordinate employing the value of the parametric variable placing the computed vertical coordinate within the predetermined range of the desired integral interval;

forming line segments between respective adjacent computed points; and controlling said print engine according to said image data and control signals to print a corresponding page.

9. The printer of claim 8, wherein:

said data processor is further programmed to adjust the interval of the parametric variable dependent upon said comparison includes doubling the selected interval of the parametric variable upon detection of one direction of error in the computed vertical coordinate and halving selected interval of the parametric variable upon detection of an opposite direction of error in the computed vertical coordinate.

10. A printer comprising:

a transceiver adapted for bidirectional communication with a communications channel;

a memory;

a print engine adapted for placing color dots on a printed page according to received image data and control signals; and a programmable data processor connected to said transceiver, said memory and said print engine, said programmable data processor programmed to receive print data corresponding to pages to be printed from the communications channel via said transceiver;

convert said print data into image data and control signals for supply to said print engine for printing a corresponding page, said conversion including converting a curve expressed as a Bezier curve into a corresponding set of line segments by:

expressing the Bezier curve in a pair of parametric equations in horizontal and vertical coordinates in a parametric variable, computing respective horizontal and vertical coordinates of a plurality of points at intervals of the parametric variable selected to provide integral steps in the vertical coordinate;

forming line segments between respective adjacent computed points;

test adjacent computed vertical coordinates to detect an inflection point in the Bezier curve;

compute respective horizontal and vertical coordinates of the plurality of points initially advances said parametric variable from 0.0 toward 1.0 unless and until an inflection point is detected;

thereafter compute respective horizontal and vertical coordinates of the plurality of points advancing said parametric variable from 1.0 toward 0.0; and controlling said print engine according to said image data and control signals to print a corresponding page.

* * * * *